(12) United States Patent
Singer

(10) Patent No.: US 10,029,653 B1
(45) Date of Patent: Jul. 24, 2018

(54) WINDSHIELD TOUCH AND CLEAN SYSTEM

(71) Applicant: Nicholas J. Singer, Irvine, CA (US)

(72) Inventor: Nicholas J. Singer, Irvine, CA (US)

( * ) Notice: Subject to any disclaimer, the term of this patent is extended or adjusted under 35 U.S.C. 154(b) by 0 days.

(21) Appl. No.: 15/921,551

(22) Filed: Mar. 14, 2018

Related U.S. Application Data

(63) Continuation-in-part of application No. 15/782,766, filed on Oct. 12, 2017, now Pat. No. 9,963,118, which is a continuation-in-part of application No. 15/433,843, filed on Feb. 15, 2017, now Pat. No. 9,815,435, which is a continuation of application No.
(Continued)

(51) Int. Cl.
| | | |
|---|---|---|
| *B08B 7/04* | (2006.01) | |
| *B60S 1/48* | (2006.01) | |
| *B60S 1/34* | (2006.01) | |
| *B60S 1/38* | (2006.01) | |
| *B08B 1/00* | (2006.01) | |

(52) U.S. Cl.
CPC ............ *B60S 1/481* (2013.01); *B08B 1/00* (2013.01); *B08B 1/001* (2013.01); *B08B 1/002* (2013.01); *B08B 1/005* (2013.01); *B08B 1/006* (2013.01); *B60S 1/3409* (2013.01); *B60S 2001/3831* (2013.01); *B60S 2001/3834* (2013.01)

(58) Field of Classification Search
CPC ............... B60S 1/481; B60S 1/3409; B60S 2001/3831; B60S 2001/3834; B08B 1/00; B08B 1/001; B08B 1/002; B08B 1/005; B08B 1/006
See application file for complete search history.

(56) References Cited

U.S. PATENT DOCUMENTS

| | | |
|---|---|---|
| 1,859,641 A | 5/1932 | Seymour |
| 2,615,190 A | 10/1951 | Dan et al. |
| 3,080,592 A | 3/1963 | Hassage |
| (Continued) | | |

FOREIGN PATENT DOCUMENTS

| | | |
|---|---|---|
| DE | 102005021475 | 11/2006 |
| DE | DE102005021475 | 11/2006 |
| (Continued) | | |

OTHER PUBLICATIONS

Katie Allen, European Search Report, dated Oct. 26, 2017, pp. 1-2.
European Search Opinion, dated Nov. 7, 2017, pp. 1-5.

*Primary Examiner* — Bibi Sharidan Carrillo
(74) *Attorney, Agent, or Firm* — Stetina Brunda Garred and Brucker

(57) ABSTRACT

A cleaning device for a vehicle has tracks above and below the vehicle's windshield. A brush, wiper blade and spray bar extend across the windshield at a starting side of the windshield. The spray bar provides washer fluid as the brush rotates against the windshield. The spray bar, rotating brush and wiper bar are moved along the tracks and across the windshield to an opposing, return side of the windshield where the wiper blade first contacts the windshield and the brush stops rotating and moves away from the windshield. The spray bar rotates next to the wiper blade to blow air against the windshield. The wiper blade scrapes water while air blows water off the windshield as they move back to the starting side of the windshield where they are stored in a frame along the side of the windshield when not in use.

5 Claims, 30 Drawing Sheets

Related U.S. Application Data

15/199,659, filed on Jun. 30, 2016, now Pat. No. 9,707,935.

(56) References Cited

U.S. PATENT DOCUMENTS

| | | | |
|---|---|---|---|
| 3,790,083 | A | 2/1974 | Redifer |
| 4,274,175 | A | 6/1981 | Nishikawa |
| 4,611,364 | A | 9/1986 | Gruebner |
| 4,945,601 | A | 8/1990 | Bilodeau |
| 5,157,312 | A | 10/1992 | Wallrafen |
| 5,323,508 | A | 6/1994 | Sheldrake |
| 5,502,865 | A | 4/1996 | Zhou |
| 6,283,656 | B1 * | 9/2001 | Jiang ................ B60S 3/047 15/103 |
| 6,799,349 | B2 | 10/2004 | Stouder, II |
| 7,503,091 | B2 | 3/2009 | White, Jr. et al. |
| 8,032,976 | B2 | 10/2011 | Nelson |
| 8,381,348 | B2 | 2/2013 | Egner-Walter et al. |
| 8,745,814 | B2 | 6/2014 | Nelson |
| 9,707,935 | B1 | 7/2017 | Singer |
| 9,815,435 | B1 | 11/2017 | Singer |
| 9,963,118 | B2 | 5/2018 | Singer |
| 2006/0059648 | A1 | 3/2006 | Meredith |
| 2008/0034531 | A1 | 2/2008 | Beaver |
| 2009/0100627 | A1 | 4/2009 | Renke |
| 2013/0180544 | A1 * | 7/2013 | Nelson ................ B60S 1/08 134/6 |
| 2015/0066293 | A1 | 3/2015 | Davies |
| 2016/0355161 | A1 * | 12/2016 | Paro ................ B60S 3/047 |

FOREIGN PATENT DOCUMENTS

| | | |
|---|---|---|
| DE | 102008052442 | 6/2009 |
| DE | DE102008052442 | 6/2009 |
| EP | 1457398 A2 | 9/2004 |
| EP | 2639121 | 9/2013 |
| JP | S58177753 | 10/1983 |

* cited by examiner

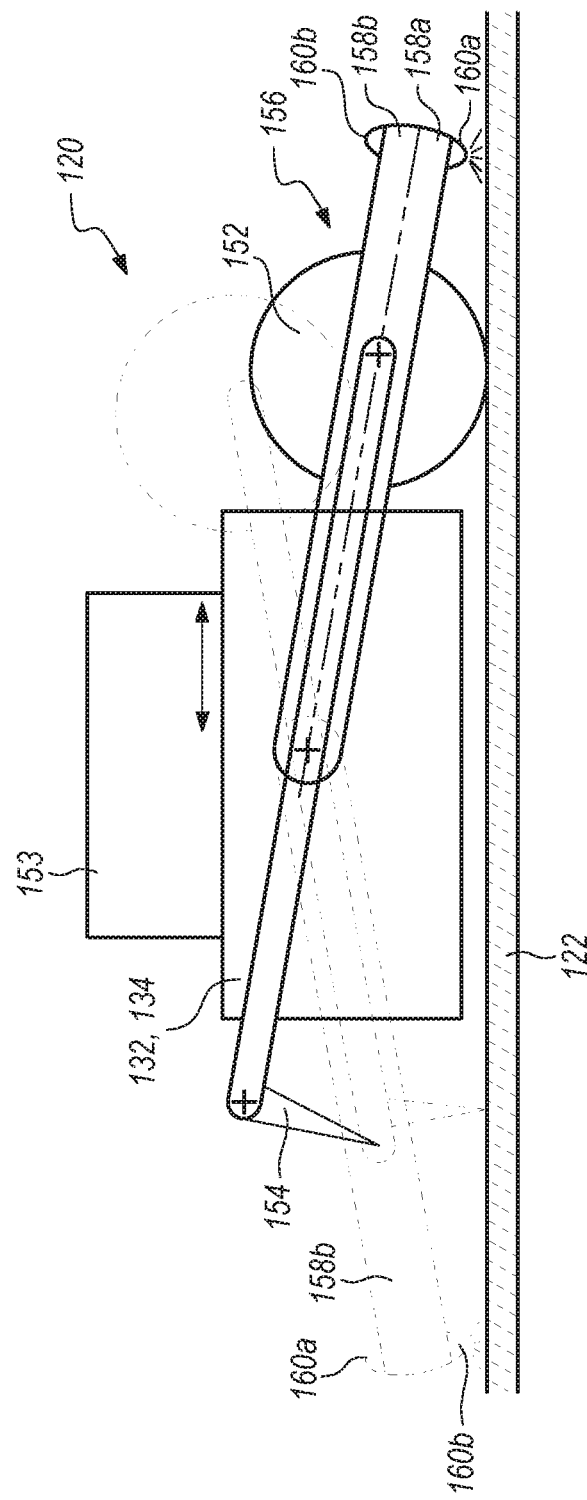

WINDSHIELD TOUCH AND CLEAN SYSTEM

CROSS-REFERENCE TO RELATED APPLICATIONS

This application is a continuation in part of U.S. patent application Ser. No. 15/782,766, filed on Oct. 12, 2017, now U.S. Pat. No. 9,963,118, issued on May 8, 2018 which is a continuation in part of U.S. patent application Ser. No. 15/433,843, filed on Feb. 15, 2017, now U.S. Pat. No. 9,815,435, issued on Nov. 14, 2017, which is a continuation application of U.S. patent application Ser. No. 15/199,659, filed on Jun. 30, 2016, now U.S. Pat. No. 9,707,935, issued on Jul. 18, 2017, the entire content of which are all expressly incorporated herein by reference.

STATEMENT RE: FEDERALLY SPONSORED RESEARCH/DEVELOPMENT

Not Applicable

BACKGROUND

The various embodiments and features described herein relate to a windshield touch and clean system of an automobile which includes at least passenger vehicles, trucks and motor homes. It also includes a method and an apparatus that is affixed to a motor vehicle for washing the front windshield of a large motor vehicle such as a bus or recreational vehicle (RV).

Vehicles with large windshields, such as busses and RV's have windshield wipers to clear enough of the windshield for drivers to operate the vehicles. But such large windshields have substantial areas not cleared by conventional windshield wipers that rotate about fixed pivots. Because passengers look out the front windshield, any dirt on the windshield that obscures viewing is undesirable. There is thus a need for an improved method and apparatus to clean more of the area of large windshields than occurs with conventional rotating windshield wipers.

Because large windshields on such vehicles as busses and RV's are more vertical than other motor vehicles, the insects and debris that hit the windshield impact with greater force and that can sometimes make the residual debris stick to the windshield with greater force than if the windshield were inclined. Also, if the residual debris dries the debris may be difficult to remove using the windshield wipers and washer fluid provided with conventional motor vehicles. Moreover, the windshield wipers provide a wiping action by a rubber blade which is not an efficient cleaning device for hardened-on debris. Further, any debris located outside the area reached by the windshield wipers will remain and obstruct viewing through the windshield. There is thus a need for an improved method and apparatus to clean large windshields.

BRIEF SUMMARY

Two embodiments of a windshield touch and clean system are disclosed herein, with further embodiments of windshield cleaning systems also disclosed. The windshield touch and clean system has a cleaning head that can reach the entire surface area of the windshield to clean the entire windshield or may be operated to spot clean a localized area of the windshield, as needed. The cleaning head of the windshield touch and clean system may be operated with two extension members rotatable about articulating joints or a gantry system wherein a horizontal member rides within tracks up and down the windshield and the cleaning head moves left and right on the horizontal member.

More particularly, an automobile having a windshield touch and clean system is disclosed. The automobile may comprise a plurality of wheels; an engine connected to the plurality of wheels for propelling the automobile forward; a steering wheel connected to at least one of the at least two wheels for guiding a direction of the automobile; a windshield for protecting a driver of the automobile from projectiles; and the windshield touch and clean system.

The windshield touch and clean system may be positioned outside of the automobile below the windshield. The windshield touch and clean system may have a cleaning head for washing dirt off of the windshield. The head may be connected to the automobile with first and second extension members connected to each other with an articulating joint so that the head may be positioned at a location within a primary field of view of the windshield. The first extension member may be connected to the head. The second extension member may be pivotally connected to the first extension member. The second extension member may be pivotally connected to the automobile.

The head of the windshield touch and clean system may have a brush.

The head of the windshield touch and clean system may have a vibration unit for vibrating the head while cleaning dirt off-of the windshield.

The head or the first extension member of the windshield touch and clean system may have a spray nozzle for spraying cleaning fluid on the windshield.

The windshield touch and clean system of the automobile may further have a computer mounted to the automobile for controlling the head.

The windshield touch and clean system of the automobile may further have a motor for controlling the first and second extension members and the position of the head on the windshield.

The windshield touch and clean system of the automobile may further comprise a tube for routing cleaning fluid toward the cleaning head and being fluidically connected to a spray nozzle disposed on or adjacent to the cleaning head.

The automobile may further comprise a touch screen displaying a visual depiction of the windshield and the touch screen being connected to a computer which controls positioning of the head.

In another aspect, a method of cleaning a dirty spot on a windshield of an automobile is disclosed. The method may comprise the steps of receiving a location to be cleaned from a touch screen; activating a motor to traverse a cleaning head to a corresponding location on the windshield of the automobile and traverse back and forth over the corresponding location on the windshield of the automobile; and activating a pump to spray cleaning fluid out of a spray nozzle onto the corresponding location on the windshield of the automobile;

The method may further comprise the step of activating a vibration unit attached to the cleaning head.

The method may further comprise the step of rotating brushes of the cleaning head to clean the corresponding location on the windshield of the automobile.

A cleaning device is provided for a motor vehicle with tracks above and below the vehicle's windshield. A brush, wiper blade and spray bar extend across the windshield at a starting side of the windshield. The spray bar provides washer fluid to the brush as it rotates against the windshield. The spray bar, brush and wiper bar move along the tracks across the windshield to an opposing, return side of the windshield where the wiper blade first contacts the windshield and the brush stops rotating and moves away from the windshield. The spray bar rotates next to the wiper blade to blow air against the windshield. The wiper blade scrapes water while air blows water off the windshield as they move back to the starting side of the windshield where they move into a frame along the starting side of the windshield and are covered when not in use.

A cleaning system is provided that is retained in a frame that encircles the outer periphery of a motor vehicle's windshield and that houses and guides a cleaning mechanism as it moves across the windshield from side to side so as to clean a larger portion of the windshield than rotating wipers. The frame has a generally horizontal top and bottom, joined by generally vertical start and return sides, with a staring door and return door on the respective start and return sides. The cleaning system has a rotatable brush, a wiper blade and a spray bar (with spray nozzles along its length) are contained in the starting side frame so those parts can extend between the top and bottom of the windshield as they move from a starting side of the windshield to the opposing, return side of the windshield. The brush, wiper blade and spray bar may be concealed in the starting side frame by the starting door when not in use. A lower track within the bottom frame extends along the bottom of the windshield with an upper track, within the top frame, extending along the top portion of the windshield. The tracks are generally horizontal but may bow or curve with the curvature of the windshield. The brush and wiper blade extend between upper and lower carriers that are connected to and move along the upper and lower tracks, respectively, with the carriers preferably covered by the starting door when the system is not in use.

A first drive mechanism moves the brush, wiper blade and spray bar on the tracks across the windshield and back, from the starting side to the return side and back to the starting side. A second drive mechanism rotates the brush as it moves across the windshield from the starting side to the return side to clean debris from the windshield, with the brush preferably not rotating as it moves from the return side to the starting side. The spray bar has a first fluid channel in fluid communication with a pump and a washer fluid reservoir and has a second fluid channel in fluid communication with an air reservoir and an air compressor. When the storage door opens, the spray bar rotates to a position near the brush and windshield and between the brush and the return side, with the pump actuated to spray water through the first fluid channel and first spray nozzles onto the windshield as the brush is rotated and moved from the storage side to the return side.

As the spray bar reaches the return side and the return door a rotating mechanism rotates the spray bar about half a rotation so it is adjacent the windshield near the wiper blade and between the wiper blade and the starting side. During that rotation the flow of washer fluid through the first channel and first spray nozzles stops, and flow of air through the second flow channel and second spray nozzles begins, with the spray bar spraying air against the washed surface adjacent the wiper blade and preferably forming one or two blades of air directing the wash fluid toward the top and/or bottom of the windshield. As the spray bar rotates from the return side to the starting side of the brush and the flow of washer fluid stops, the rotation of the brush continues so that centrifugal force throws water off the brush. Also, as the spray bar rotates from the return side to the starting side of the brush, a rotating mechanism rotates the brush out of contact with the windshield and rotates the wiper blade into contact with the windshield.

As the first drive mechanism moves the cleaning mechanism from the return side to the starting side, the air from the second channel of the spray bar blows water and debris off the windshield and the wiper blade acts like a squeegee to wipe water from the windshield. When the spray bar reaches the starting side and the starting frame, it rotates to a generally vertical storage position as the wiper blade and brush enter the left side of the frame and the flow of air through the second channel is shut off. When the brush is within the starting side frame, the starting side door and return side doors close.

In more detail a cleaning apparatus is provided for a motor vehicle windshield having a starting side and opposing return side, a top and bottom side. The cleaning apparatus may include a rotatable brush, a wiper blade and a spray bar each extending between the top and bottom sides of the windshield. The spray bar has first and second fluid channels each of which has respective first and second spray nozzles extending along a length of the respective first and second fluid channels. The spray bar has first and second use positions and a storage position. The first use position has the first spray nozzles adjacent the windshield and located between the brush and the return side. The second use position has the second spray nozzles adjacent the windshield and located between the wiper blade and the starting side. The apparatus may also include a fluid pump in fluid communication with the first fluid channel and a container of washer fluid to pump washer fluid through the first fluid channel and first spray nozzles at a first pressure. An air compressor may be in fluid communication with the second fluid channel and second spray nozzles and an air storage container to provide air to the second fluid channel and second spray nozzles at a second pressure. The apparatus may have a bottom track extending along the bottom of the windshield and a top track extending along a top of the windshield, with a bottom carrier moving along the bottom track and connected to the brush, wiper blade and spray bar and a top carrier moving along the top track and connected to the brush, wiper blade and spray bar. A drive mechanism may be connected to at least one of the top and bottom carriers to move the at least one of the top and bottom carriers across the windshield and back.

In further variations, the cleaning apparatus may further include a frame encircling the windshield, including such components such as a top frame containing the top track and a bottom frame containing the top track. A starting frame may be placed along the starting side of the windshield, with the starting frame extending between the top and bottom frames and containing the wiper blade, spray bar, brush and associated carrier or carriers when they not in use. A return frame may be placed opposite the starting frame and advantageously extends between the top and bottom frames at the return side of the windshield. Advantageously, a starting door releasably covers the starting frame, wiper blade, spray bar and brush and a return door releasably covers the return frame.

There is also provided a method of cleaning the outer surface of a motor vehicle windshield having a starting side and opposing return side. The method comprises the steps rotating a spray bar to a first position between a brush and the return side of the windshield and adjacent the windshield. The brush and spray bar each extend from a top to a bottom of the windshield. The spray bar has first and second fluid channels with a plurality of first spray nozzles in fluid communication with the first fluid channel and a plurality of second spray nozzles in fluid communication with the second flow channel. The method may include rotating the brush while it is in contact with the outer surface of the windshield to clean the windshield while flowing a washing fluid through the first channel and first plurality of spray nozzles at a pressure sufficient to spray the washing fluid through the plurality of first spray nozzles to the windshield at a location between the rotating brush and the return side of the windshield. The method advantageously moves that rotating brush and spray bar from the start side to the finish side of the windshield while maintaining the rotating brush in contact with the outer surface of the windshield to clean the windshield. The method may further move a wiper blade from the start side to the finish side of the windshield while the wiper blade extends between the top and bottom of the windshield but is not in contact with the windshield. The method advantageously stops the flow of washing fluid through the first channel and first plurality of spray nozzles when the spray bar is at the return side of the windshield. The method may include rotating the spray bay to a second position with the second plurality of spray nozzles adjacent the windshield and between the start side of the windshield and the wiper blade. The wiper is placed in contact with the windshield, rotation of the brush is stopped and air is flowed through the second channel and second plurality of spray nozzles at a pressure sufficient to deflect water away from the wiper blade. The method advantageously moves the wiper blade, spray bar and brush from the return side to the starting side with the wiper blade in contact with the windshield and the brush not in contact with the windshield.

In further variations, the method may include placing the covering the wiper blade, brush and spray bar in a starting side frame extending along the starting side of the windshield and placing a removable cover over that starting side frame. The flow of washing fluid may be stopped before the spray bar is rotated to the second position. Likewise, the rotation of the brush may stop before the spray bar is rotated to the second position, or after. The flow of washing fluid through the first channel is advantageously at a pressure sufficient to create a spray through the first plurality of spray nozzles. The flow of air through the second channel may be provided by air from a storage container, by air from a compressor, or both. The step of moving the rotating brush and spray bar from the start side to the finish side of the windshield may comprise connecting a first end of the brush and wiper blade to a carrier block connected to a track extending along one of the top or bottom of the windshield and moving the carrier block along that track.

There is also provided an apparatus for cleaning windshields of a motor vehicle where the windshield has an opposing top and bottom joined by an opposing starting side opposite a return side. The apparatus is enclosed in a frame that is advantageously a generally rectangular frame configured to fit around the outside of the motor vehicle windshield. The frame may have opposing top and bottom frames, and a starting side frame opposite a return side frame. Each frame has opposing sides joined to a bottom. The starting side frame advantageously has a cover which may be opened and closed. The apparatus advantageously has a top track inside and connected to the top frame and extending across at least a substantial length of the top of the windshield. A top carrier is connected to and movable along that top track. Likewise, a bottom track is inside and connected to the bottom frame and extends across at least a substantial length of a bottom of the windshield. A bottom carrier is connected to and movable along that bottom track. A rotatable brush has opposing top and bottom ends with the top brush end connected to the top carrier and the bottom brush end connected to the bottom carrier. A wiper blade has opposing top and bottom ends with the top blade end connected to the top carrier and the bottom blade end connected to the bottom carrier. A spray bar has opposing top and bottom spray bar ends with the top spray bar end rotatably connected to the top carrier and the bottom spray bar end rotatably connected to the bottom carrier. The spray bar preferably has a first fluid channel in fluid communication with a first plurality of spray nozzles extending along a first side of the spray bar and a second plurality of spray nozzles in fluid communication with a second plurality of spray nozzles extending along a second side of the spray bar and orientated in a direction substantially opposite the first plurality of spray nozzles. The top and bottom carriers, rotatable brush, wiper blade and spray bar fit within the starting side frame when the starting side frame cover is closed to enclose the top and bottom carriers, rotatable brush, wiper blade and spray bar.

In further variations, the cleaning apparatus may further include a pump in fluid communication with the first fluid channel of the spray bar and a source of washer fluid. The apparatus also advantageously includes at least one of a compressor or an air storage container in fluid communication with the second fluid channel of the spray bar. The top and bottom tracks are advantageously slightly curved so the opposing ends of the top and bottom tracks are offset from a middle of the respective track to conform to a curvature of the adjacent portion of the windshield. Advantageously, the spray bar is configured to rotate between a first and second position where the first position has the first plurality of spray nozzles adjacent the windshield and located between the brush and the return side of the windshield, and where the second position has the second plurality of spray nozzles adjacent the windshield and located between the wiper blade and the starting side of the windshield.

BRIEF DESCRIPTION OF THE DRAWINGS

These and other features and advantages of the invention will become more apparent in light of the following discussion and drawings, in which like numbers refer to like parts throughout, and in which:

FIG. 18 is a schematic view of a carrier, brush and spray bar of a cleaning apparatus placed on a windshield with a washing position shown in solid lines and a drying position sown in broken lines;

DETAILED DESCRIPTION

Figure 1:
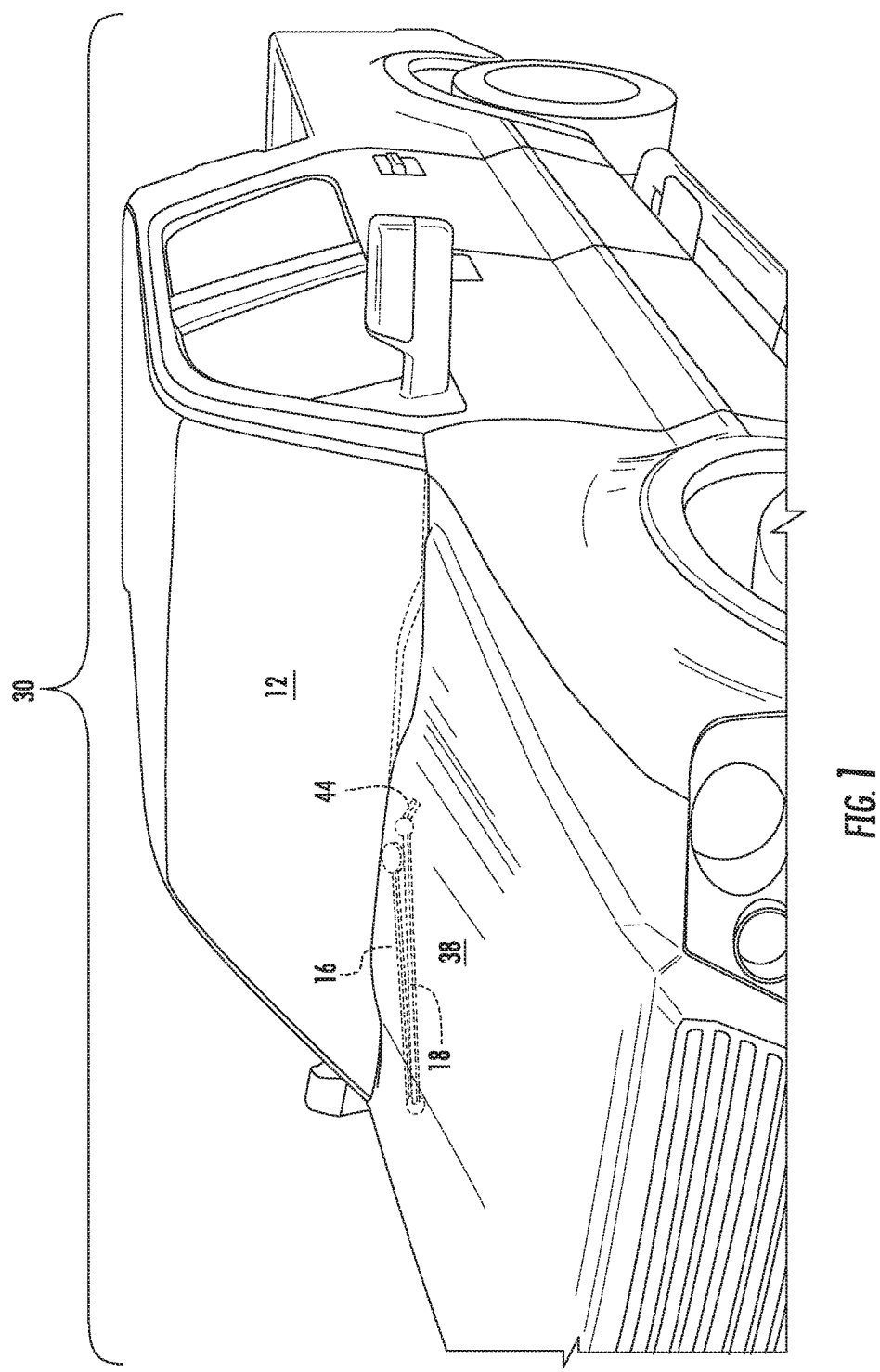
FIG. 1 is a perspective view of an automobile having a windshield touch and clean system depicting a first embodiment.
Figure 2:
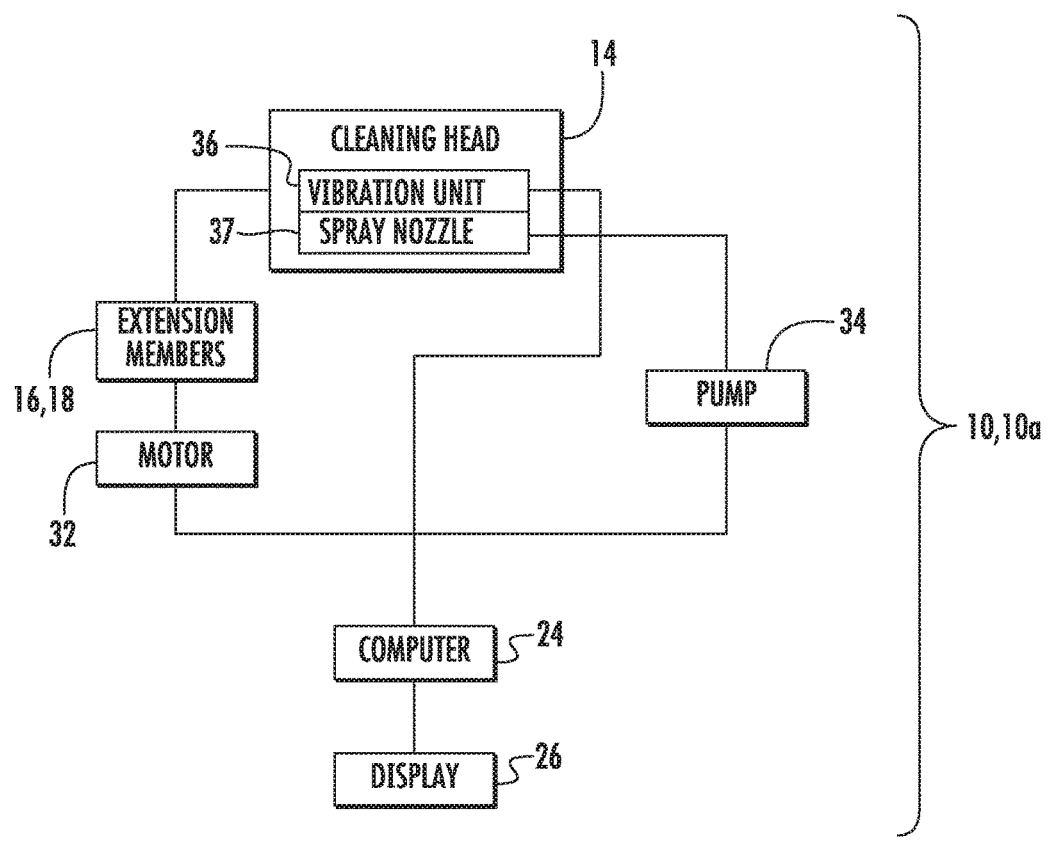
FIG. 2 is a schematic view the windshield touch and clean system of the first and a second embodiment.

Referring now to the drawings, a windshield touch and clean system 10 for spot cleaning a windshield 12 of an automobile 30 is shown. The windshield touch and clean system 10 includes a cleaning head 14 that can be traversed to any location on the windshield 12 by way of extension members 16, 18 that are pivotally attached to each other by articulating joints 20, 22. The cleaning head 14 may be controlled by a computer 24 which receives user input by way of a display 26 located in a passenger cabin of the automobile 30. A driver may touch the display 26 about where the windshield 12 is dirty. The computer 24 receives information from the display 26 which controls a motor 32 to actuate the cleaning head 14 to the location indicated by the driver on the display. A pump 34 sprays cleaning fluid on the dirt to help break down the dirt so that the dirt can be removed from the windshield 12. The motor 32 moves the cleaning head 14 over the dirt and an optional vibration unit 36 can further be activated to help remove the dirt from the windshield 12.

Figure 12:
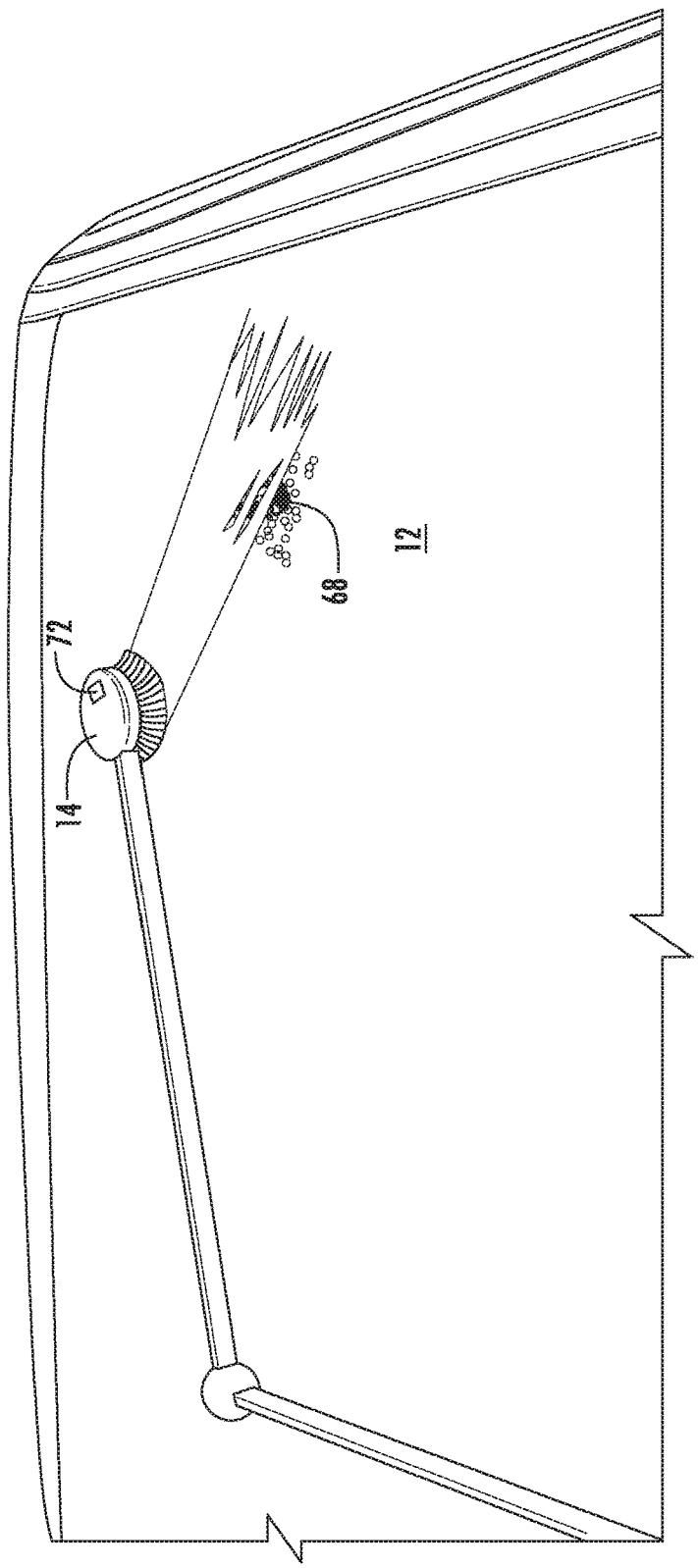
FIG. 12 illustrates the cleaning head wiping the residue off of the windshield.
Figure 13:
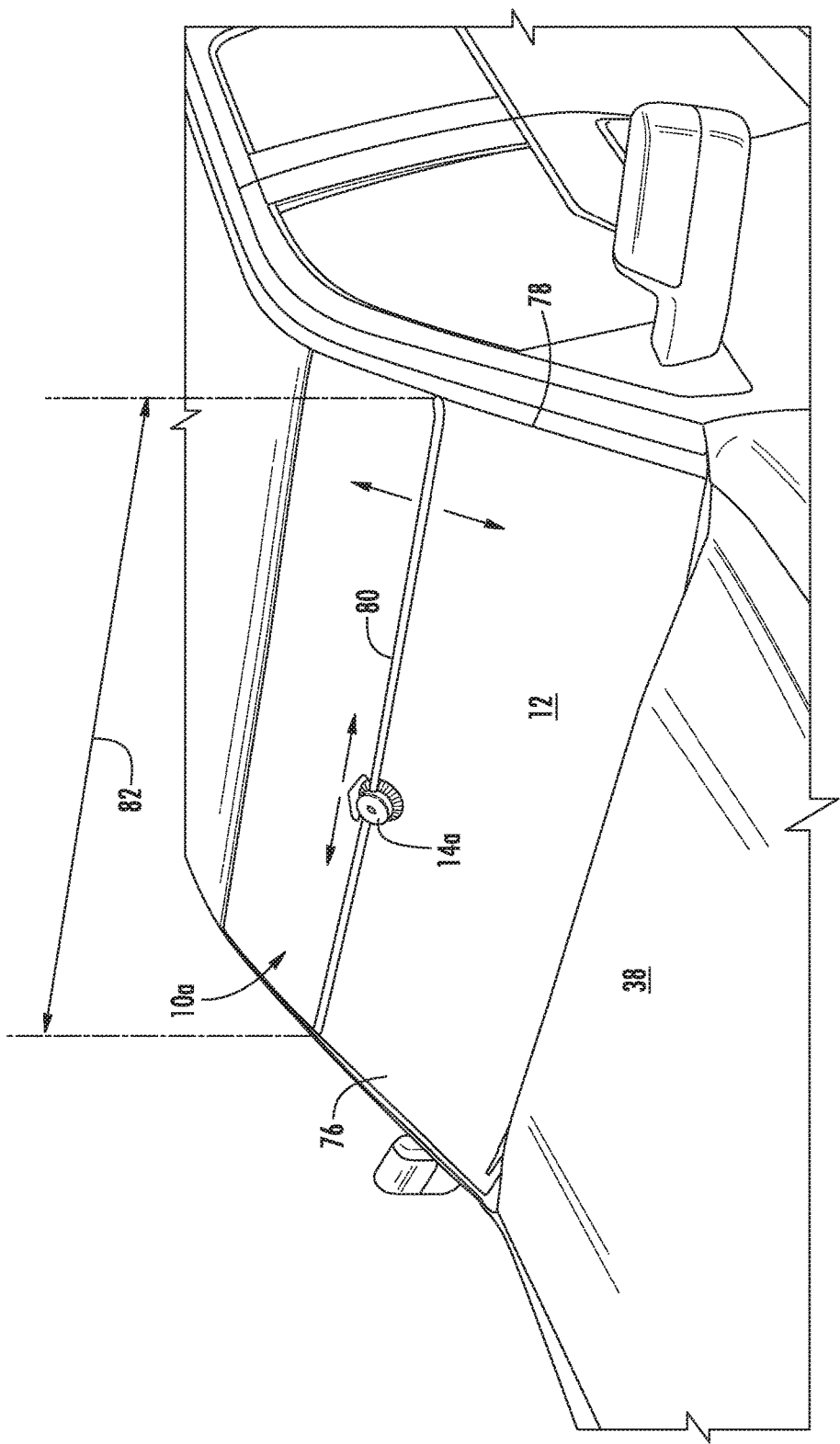
FIG. 13 illustrates the second embodiment of the windshield touch and clean system.

Referring now to the drawings, the automobile 30 may have the windshield touch and clean system 10 shown in FIGS. 1-11 or the windshield touch and clean system 10a shown in FIGS. 12-13 or combinations thereof implemented in the automobile 30 as shown in the figures. The automobile 30 shown in the figures is that of a pickup truck. However, other automobiles including but not limited to sedans, sports cars, large-format trucks, etc. may incorporate the windshield touch and clean systems 10, 10a described therein.

The windshield touch and clean system 10 is hidden under a hood 38 of the automobile when the windshield touch and clean system 10 is not in use, as shown in FIG. 1. The windshield touch and clean system 10 includes the cleaning head 14, extension members 16, 18, motor 32 which drives the extension members 16, 18, the pump 34, the computer 24 and the display 26.

Figure 3:
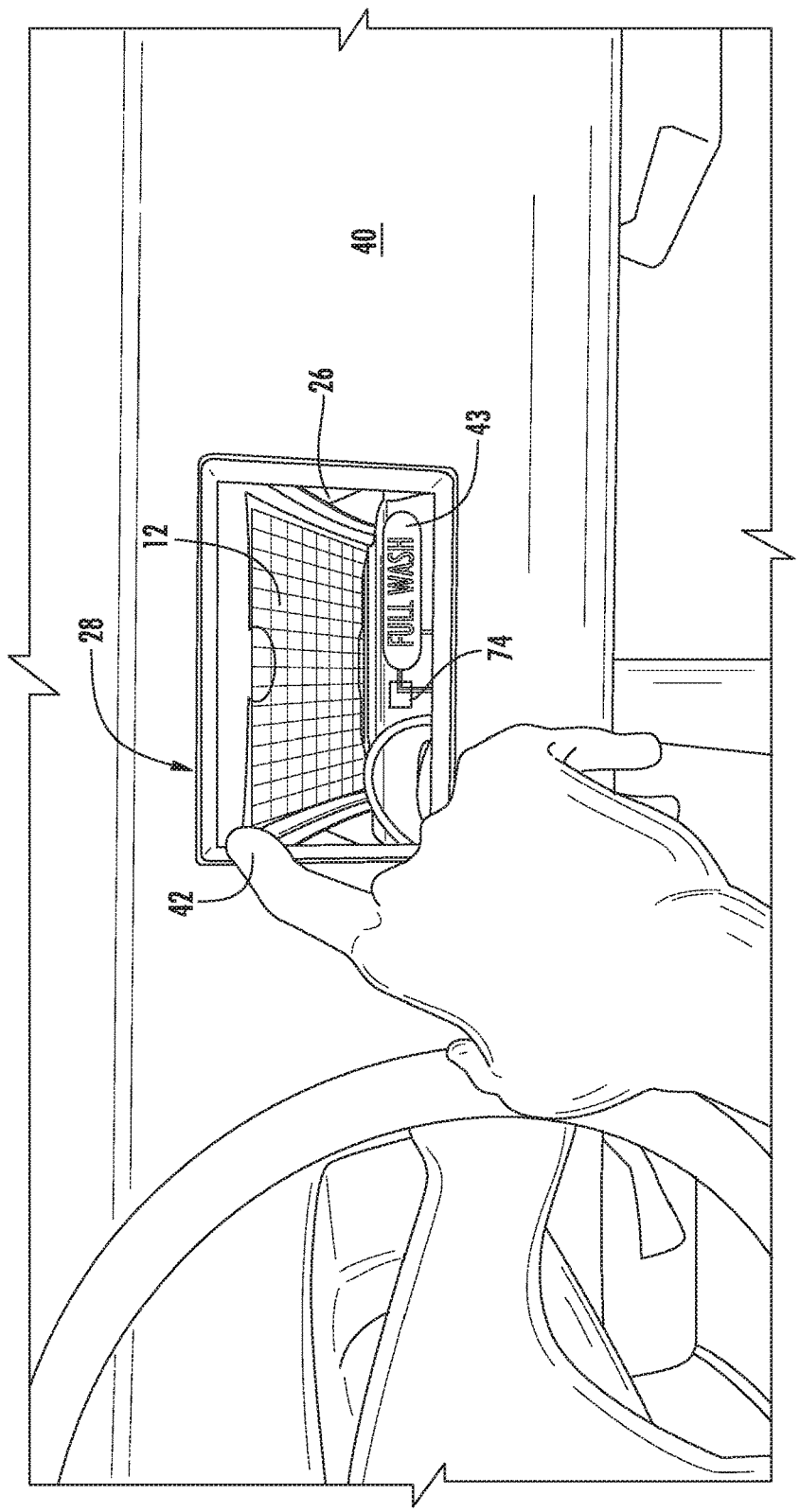
FIG. 3 is an illustration of a display of the windshield touch and clean system

To deploy the window washing system 10, the user may activate the system from the display 26 shown in FIG. 3. The display 26 may be mounted to a dashboard 40 within a cabin 28 of the automobile 30. However, it is also contemplated that the display 26 may be mounted to other areas of the passenger cabin such as the center console or driver-side armrest. The dashboard 26 may be located centrally on the dashboard 40 so that the user or driver can easily access and manipulate the display 26. The display 26 may be a touch sensitive screen as shown in FIG. 3 but may also be a mouse driven display. If the display 26 is a mouse driven display, then the automobile 30 may have a joystick located on the dashboard, center console or other area that the driver can manipulate so that a cursor on the display 26 may be traversed to a proper location. An icon displayed on the display 26, may be selected by depressing a button on the joystick or other area near the joystick. A spot on the display 26 depicting the windshield 12 may also be selected by traversing the cursor shown on the display 26 with the joystick and depressing the button. Nevertheless, the preferred embodiments show the display 26 as a touch sensitive screen. The user can touch the screen with his or her finger 42 in order to select the icon displayed on the display 26.

The display 26 illustrates the front windshield 12 of the automobile 30. Moreover, the display 26 also shows an option for a full wash 43. By depressing an area on the display 26 illustrated by the windshield 12 with the finger 42, the windshield touch and clean system 10 may be deployed and clean only a spot area or localized area on the windshield 12 as indicated by the area depressed by the finger 42 of the driver or user. Alternatively, if a full wash of the windshield 12 is desired, then the user may depress the full wash icon 43 on the display 26. Depending on whether the user depresses a localized area on the display 26 depicting the windshield 12 or the full wash icon 43, the windshield touch and clean system 10 may be deployed to wash the localized area or the entire viewing area of the front windshield.

Figure 4:
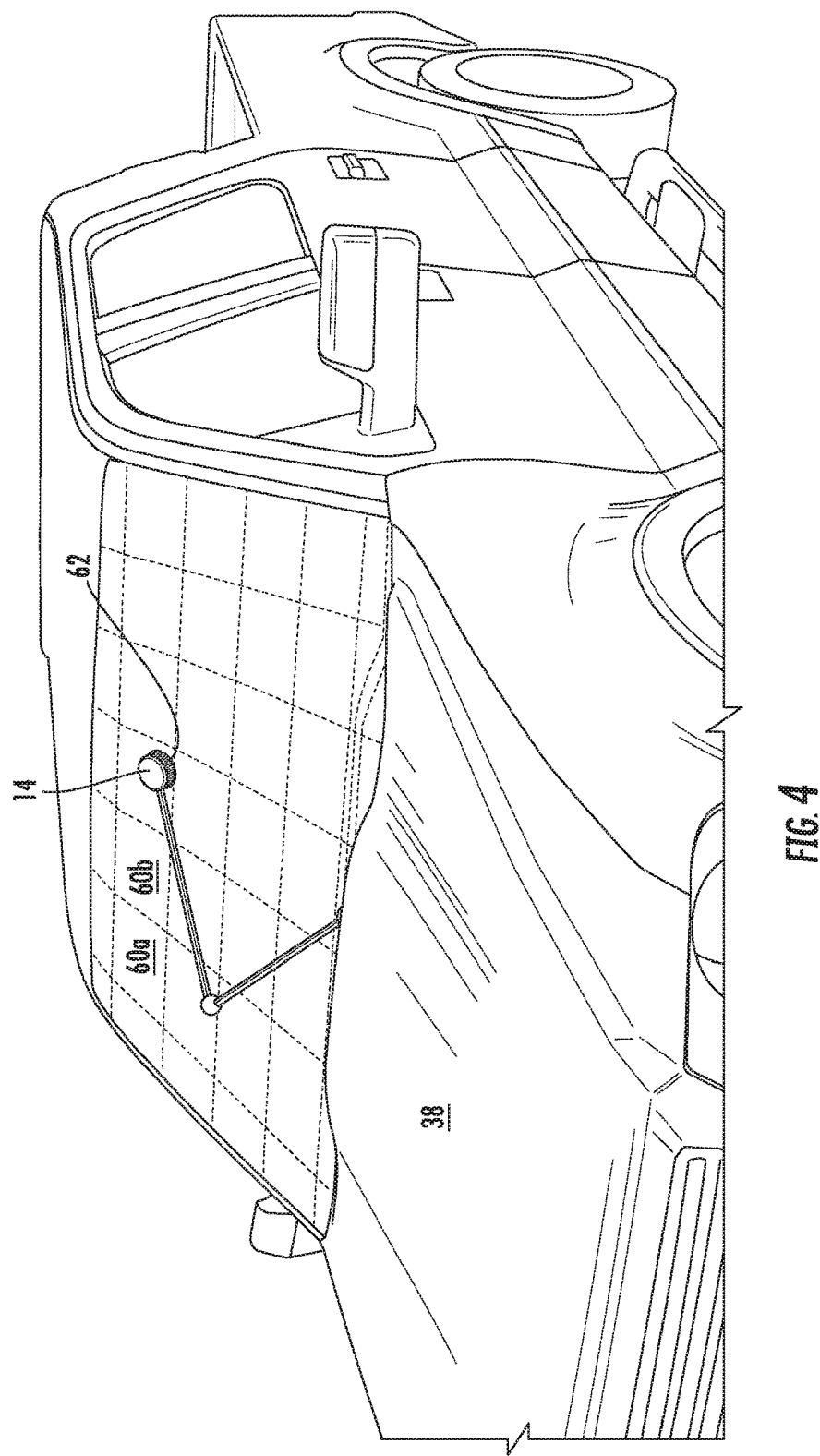
FIG. 4 is an illustration of the first embodiment of the windshield touch and clean system in a deployed configuration.
Figure 5:
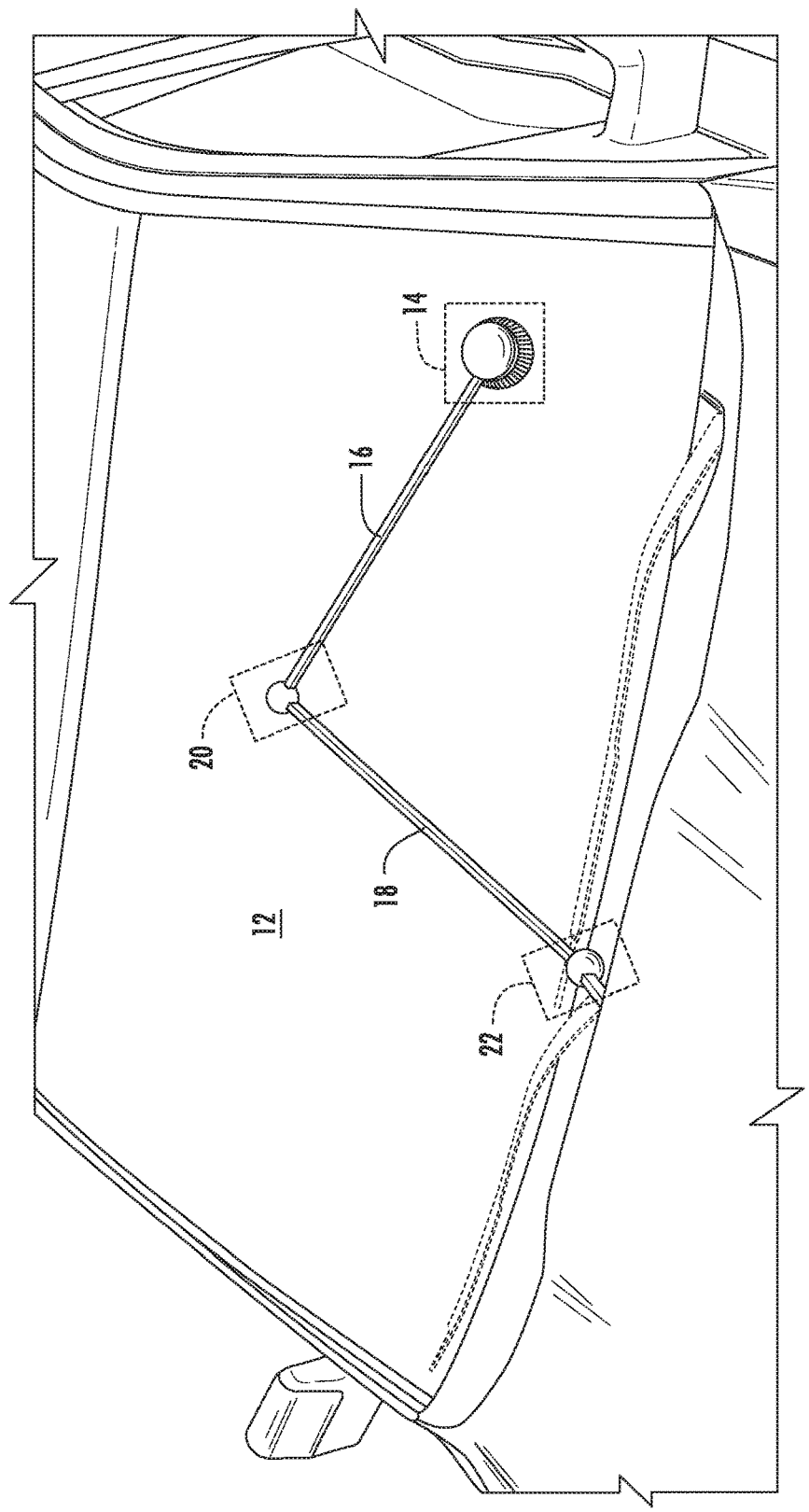
FIG. 5 is an illustration of the first embodiment of the windshield touch and clean system in the deployed configuration with a cleaning head in a different position compared to that shown in FIG. 4.
Figure 6:
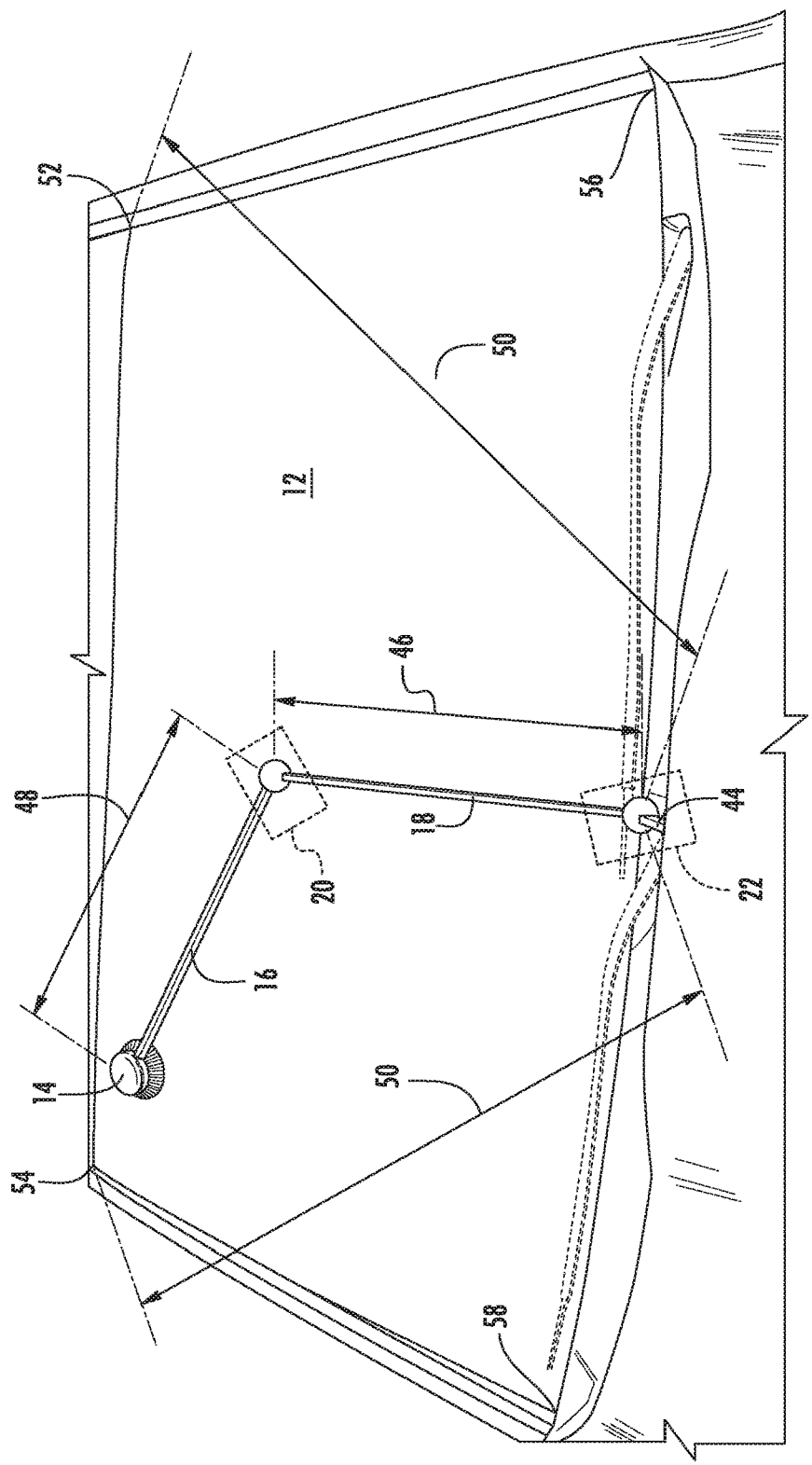
FIG. 6 is an illustration of the first embodiment of the windshield touch and clean system in the deployed configuration with the cleaning head in a different position compared to that shown in FIGS. 4 and 5.
Figure 7:
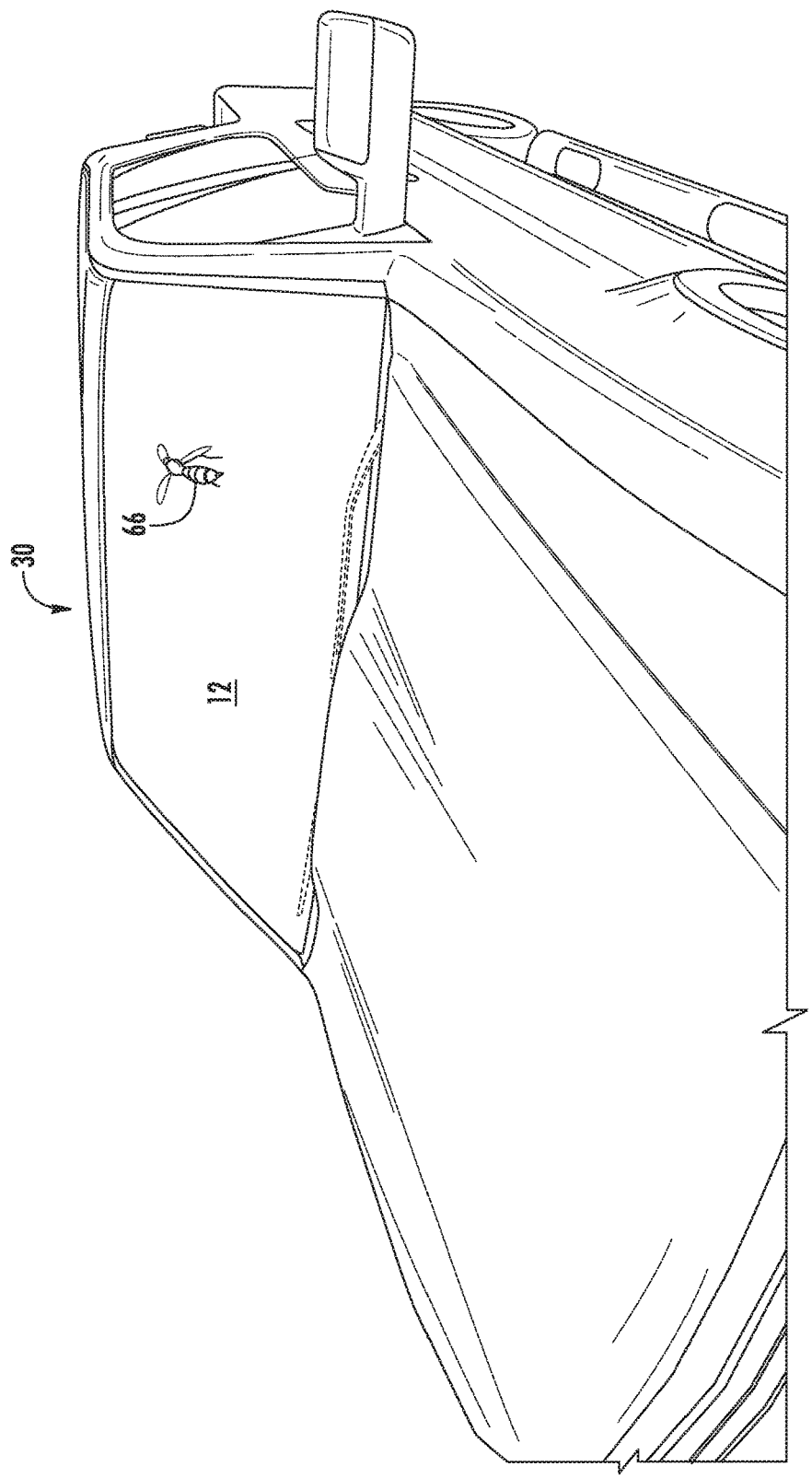
FIG. 7 illustrates a bug flying toward a windshield of an automobile.

If the driver depresses the full wash option 43 on the display 26, the windshield touch and clean system 10 begins to deploy as shown in FIG. 4. The extension members 16, 18 are raised out from under the hood 38. The extension members 16, 18 are connected to each other by way of an articulating joint 20 as shown in FIG. 5. The extension member 18 is attached to the automobile 30 by way of a base member 44. The base member 44 can also be traversed out from under the hood 38 as shown in FIG. 1 or traversed toward the windshield 12 as shown in FIG. 5. When the windshield touch and clean system 10 is tucked under the hood 38, the base member 44 is retracted under the hood 38. Also, the articulating joint 20 allows the extension members 16, 18 to be folded or made parallel with respect to each other. The extension members 16, 18 are then placed laterally and tucked under the hood 38 as shown in FIG. 1.

The articulating joints 20, 22 control movement of the extension member 18 with respect to the base member 44, and the extension member 16 with respect to the extension member 18. By having two extension members 16, 18, the entire surface area of the windshield 12 may be cleaned by the cleaning head 14. A length 46 of the extension member 18 plus a length 48 of the extension member 16 may be equal to or longer than a distance 50 from the articulating joint 22 to either of an upper driver side corner 52 or a passenger side corner 54 of the windshield 12. In this manner, when the extension members 16, 18 are linearly aligned (i.e., straight) to each other, the cleaning head 14 can reach the full extent of the windshield 12 up to the passenger side corner 54 and the driver side corner 52 of the windshield 12.

The articulating joint 22 allows the extension member 18 to rotate at least 180° so that the extension member 18 can extend horizontally toward a driver side lower corner 56 and a passenger side lower corner 58. The articulating joint 20 allows the extension member 16 to rotate at least 275° and up to 360° so that the extension member 16 can be positioned parallel on either side of the extension member 18. The extension member 18 may rotate with respect to the base member 44 and the extension member 16 may rotate with respect to the extension member 18 by way of chains and/or pulleys that are driven by a motor located under the hood 38. Alternatively, the articulating joints 20, 22 may have micro motors and gears that control the rotation of the respective extension members 16, 18 with respect to each other in the extension member 18 with respect to the base member 44.

When the user depresses the full wash option 44 on the display 26, the extension members 16, 18 are deployed out from under the hood 38. The extension members 16, 18 position the cleaning head 14 about an area on the windshield 12 to be cleaned. The cleaning head 14 cleans a small portion of the windshield 12 before it moves on to the next area of the windshield 12 to be washed. By way of example and not limitation, the windshield 12 may be divided into sections 60a-n. When the entire windshield 12 is to be washed, the cleaning head 14 may be traversed over one of the sections 60 such as section 60a. With the cleaning head 14 over the section 60a of the windshield 12, cleaning fluid may be squirted out of the cleaning head 14 on the windshield 12 at section 60a.

The cleaning head 14 may have a vibration unit that vibrates bristles 62 of the cleaning head 14 so that dirt and grime can be more effectively rubbed off of the windshield 12. As the bristles clean the windshield 12 at section 60a, the cleaning fluid drips down onto a lower section of the windshield 12. Even though the cleaning fluid drips down onto the lower section of the windshield 12, the cleaning head 14 will eventually clean that area too as the cleaning head 14 laterally cleans each section laterally from top to bottom.

The cleaning head 14 may also be paired with a rubber blade or wiper 64. In particular, the rubber wiper 64 is located under the extension member 16. The rubber wiper 64 has a generally pointed tip which contacts the windshield and is flexible so that the rubber wiper 64 can extend across a portion of section 60 that has been washed clean by the bristles 62 of the cleaning head 14 to wipe the section 60 dry by pushing the cleaning fluid to the side or downward. Alternatively, the cleaning head 14 can clean two or more sections first then the rubber wiper 64 can wipe dry two or more sections 60 at the same time. The cleaning head cleans the upper row of sections 60a, b, c-n first. Thereafter, the cleaning head 14 cleans the next lower row of sections 60 by following the procedures discussed above. It is also contemplated that the cleaning head 14 may clean all of the sections 60 of the windshield 12 first before the rubber wiper 64 wipes the windshield 12 dry.

Figure 8:
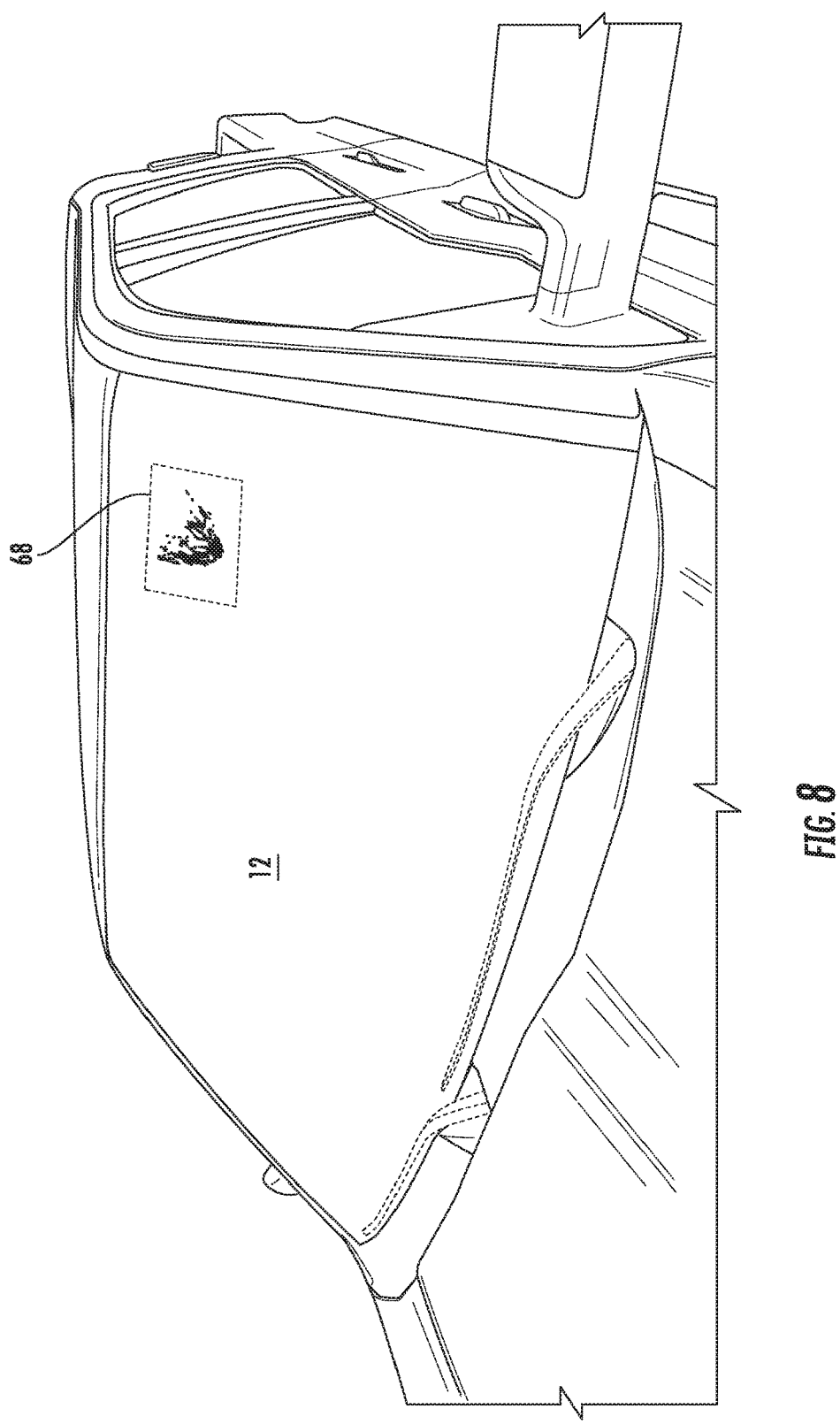
FIG. 8 illustrates the bug leaving a residue on the windshield after contacting the windshield.
Figure 9:
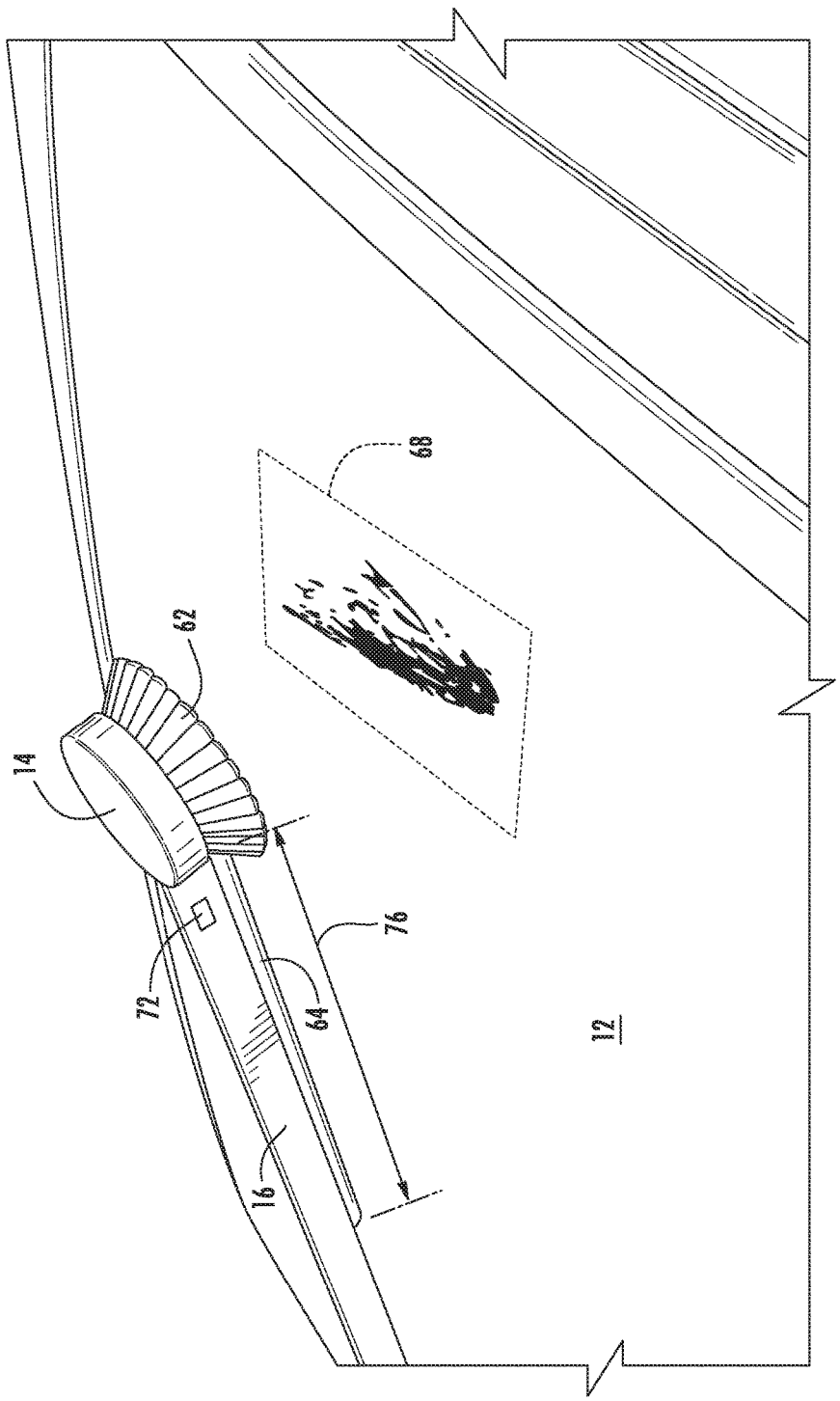
FIG. 9 illustrates the cleaning head of the first embodiment of the windshield touch and clean system positioned over the residue shown in FIG. 8.
Figure 10:
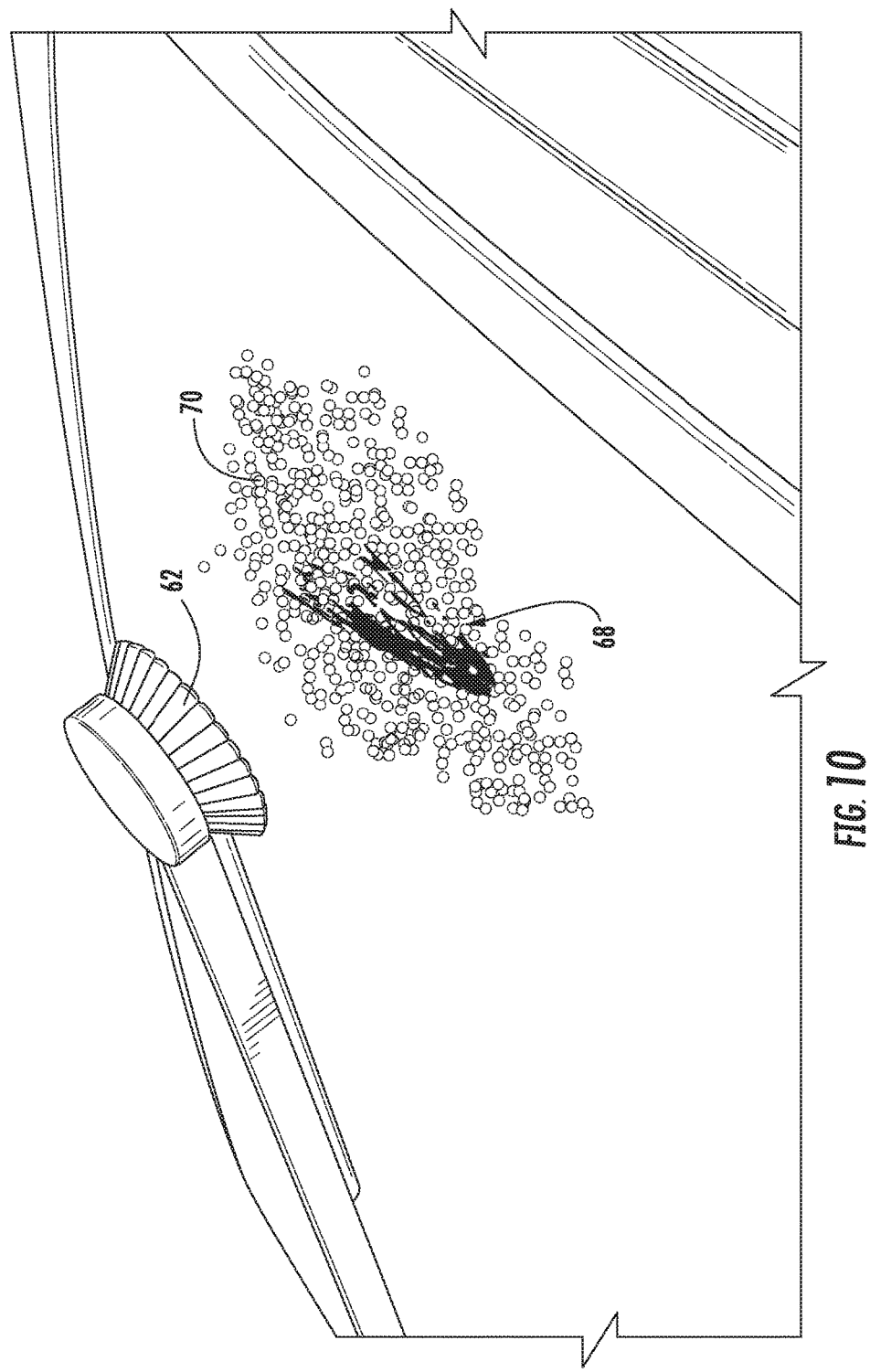
FIG. 10 illustrates cleaning fluid being sprayed on the residue via a spray nozzle mounted to the cleaning head.
Figure 11:
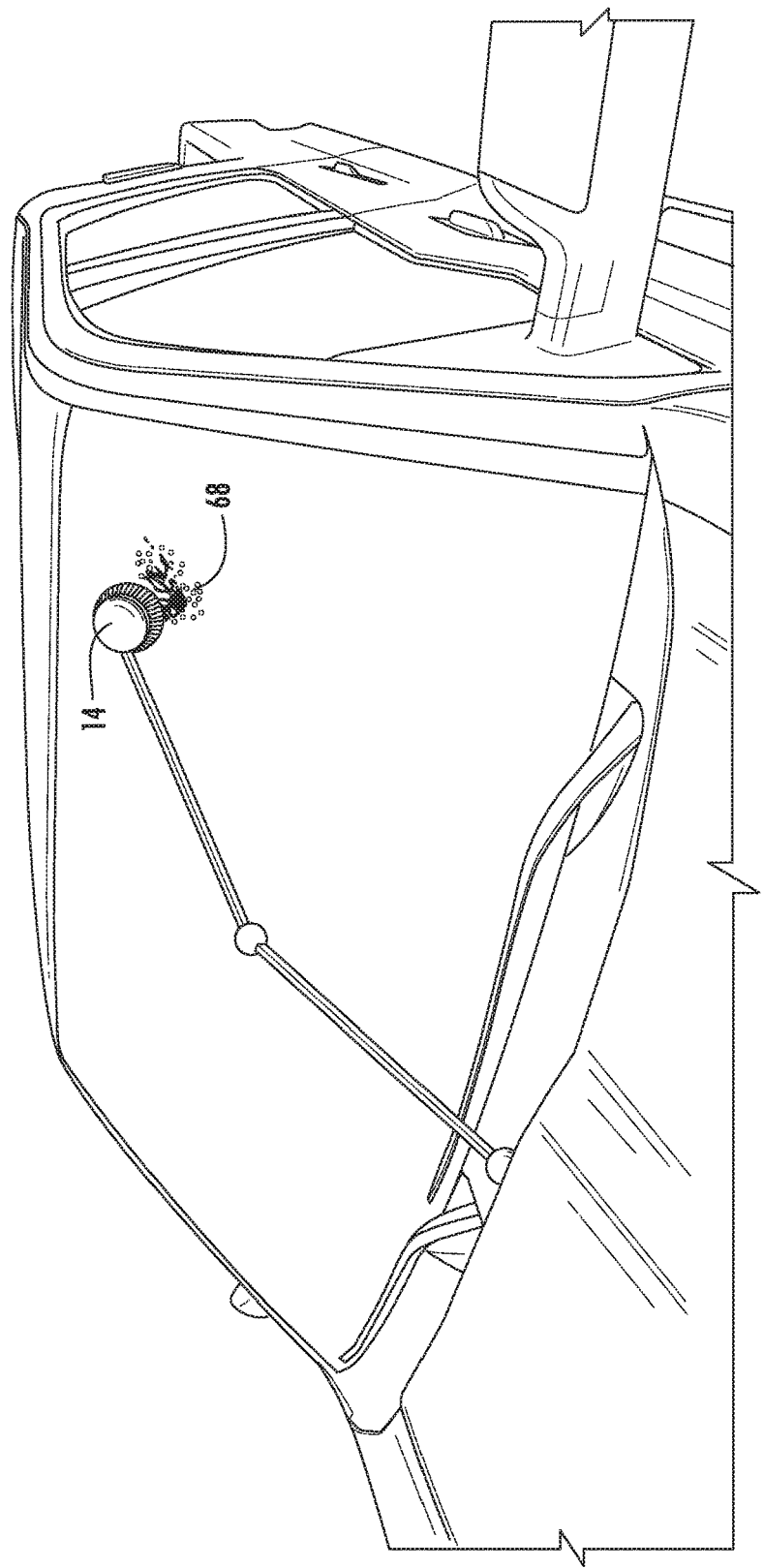
FIG. 11 illustrates the cleaning head cleaning the residue off of the windshield.

Referring now to FIGS. 7-12, the windshield touch and clean system 10 may have a spot clean feature. In this regard, the system 10 may clean a spot of dirt and grime on the windshield 12. In particular, when the automobile 30 is being driven, a bug 66 may approach the windshield 12. The bug may be killed by hitting the windshield 12, as shown in FIG. 8 and die but leave a residue 68 on the windshield 12. When the driver is driving the automobile 30, the residue 68 may visually impair the driver's vision through the windshield 12 and at the very least irritate the driver since the windshield 12 is not clean. To clean the windshield, the driver may be presented with an illustration of the windshield 12 on the display 26. The driver can depress the display 26 at about the location where the residue 68 is on the windshield 12. By depressing an area on the display 26 depicting the windshield 12, this may actuate the extension members 16, 18 and the base member 44 to move into the deployed configuration. In the deployed configuration, the extension members 16, 18 and the base member 44 move out from under the hood 38 and position the cleaning head 14 at the corresponding location on the windshield 12 where the user depressed the display 26, as shown in FIG. 9. When the cleaning head 14 is disposed over the residue 68, the cleaning head, which also has a spray nozzle 37, sprays cleaning fluid 70 on the residue 68. The cleaning head 14 is shown as being lifted above the residue 68, but this is merely for the purposes of clarification. The cleaning head 14 extends immediately above the residue 68 so that the bristles 62 contact the windshield 12. The spray nozzle for the cleaning fluid is located under the cleaning head 14 or within the outer perimeter defined by the bristles 62. A tube is routed through the extension members 16, 18 to supply the cleaning fluid to the spray nozzle.

With the cleaning head 14 disposed adjacent or on top of the residue 68, the cleaning head 14 can be traversed back and forth over the residue 68 with the motor 32 controlling the motions of the extension members 16, 18 or microcontroller in the articulating joints 20, 22. As the cleaning head 14 moves back-and-forth as shown in FIG. 12, the residue 68 is cleaned off of the windshield 12. The cleaning head 14 may be traversed back and forth but may also have other motions such a circular or oval in order to clean the residue 68 off of the windshield 12. To further facilitate cleaning of the residue 68 off of the windshield 12, the cleaning head 14 may also have a vibration unit 72 as shown in FIG. 12. The vibration unit 72 may always be on if the cleaning head 14 is in the deployed position. Alternatively, the vibration unit 72 may be on only if the user depresses the vibration option from the cabin and more particularly by depressing a vibration option icon 74 on the display 26.

The cleaning head 14 may have a plurality of bristles 62 that are formed in a round configuration. The bristles 62 may extend across the entire area defined by the outer perimeter of the bristles 62 as shown in the drawing. Alternatively, a central portion of the bristles 62 may be less dense or empty so that a spray head can protrude and spray cleaning fluid on to the windshield 12. Although the bristles 62 are shown in a round configuration, other shapes and configurations are also contemplated. By way of example and not limitation, the bristles 62 may be formed into a triangular or rectangular or square configuration. The bristles may be fabricated from a soft yet rigid material so that the distal ends of the bristles 62 may apply friction to the residue 68 to rub the residue 68 off of the windshield 12. The bristles may additionally be softer than the windshield 12 so that repeated cleaning of the windshield 12 by the cleaning head 14 does not scratch the windshield 12. By way of example and not limitation, the bristles 62 may be fabricated from a polyethylene material.

The bristles 62 are shown as being stationary or fixed to the cleaning head 14. However, it is also contemplated that the bristles 62 may rotate in a clockwise direction, counter-clockwise direction or alternate between clockwise and counterclockwise directions. A motor may be mounted within the cleaning head 14 to accomplish the rotational movement of the bristles 62. Electrical wiring may be routed to the cleaning head 14 through the extension members 16, 18 to the computer 24.

The vibration unit 72 may be mounted within the cleaning head 14 but may also be mounted near the cleaning head 14 on the extension member 16. Regardless of where the vibration unit 72 is located, the vibration unit 72 is operative to vibrate the bristles 62 to increase the cleaning action of the bristles 62 on the residue 68. The vibration unit 72, as discussed above, may have multiple modes of operation. In a first mode of operation, the vibration unit 72 may be activated and turned on only when the windshield wiper system 10 is in the deployed configuration, namely, when the cleaning head 14 is extended out from under the hood 38 and over the windshield 12. In a second mode of operation, the vibration unit 72 may be activated and turned on only after a spray nozzle located on the cleaning head 14 squirts cleaning fluid on to the windshield 12. In a third mode of operation, the vibration unit 72 may be activated and turned on only upon depression of the vibration icon 74 on the display 26. In this matter, the driver or user can dictate when the vibration unit 72 is turned on and activated.

The rubber wiper 64 may be disposed immediately under the extension member 16, as shown in FIG. 9. The rubber wiper 64 may extend downward from the extension member 16 and be positioned so that a central plane that bisects the rubber wiper 64 is generally perpendicular to the windshield wiper 12. The rubber wiper 64 may be generally flexible so that as the rubber wiper 64 squeegees the residue 68 and the cleaning fluid off of the windshield 12, the rubber wiper 64 may bend in an opposite direction compared to the direction of travel of the rubber wiper 64. A length 76 of the rubber wiper 64 may be about 4 to 6 inches and up to 18 inches long. The rubber wiper 64 is operative to wipe the residue 68 and the cleaning fluid off of the windshield 12 by causing the rubber wiper 64 to be traversed over the windshield 12 in a sweeping motion similar to a squeegee.

Figure 14:
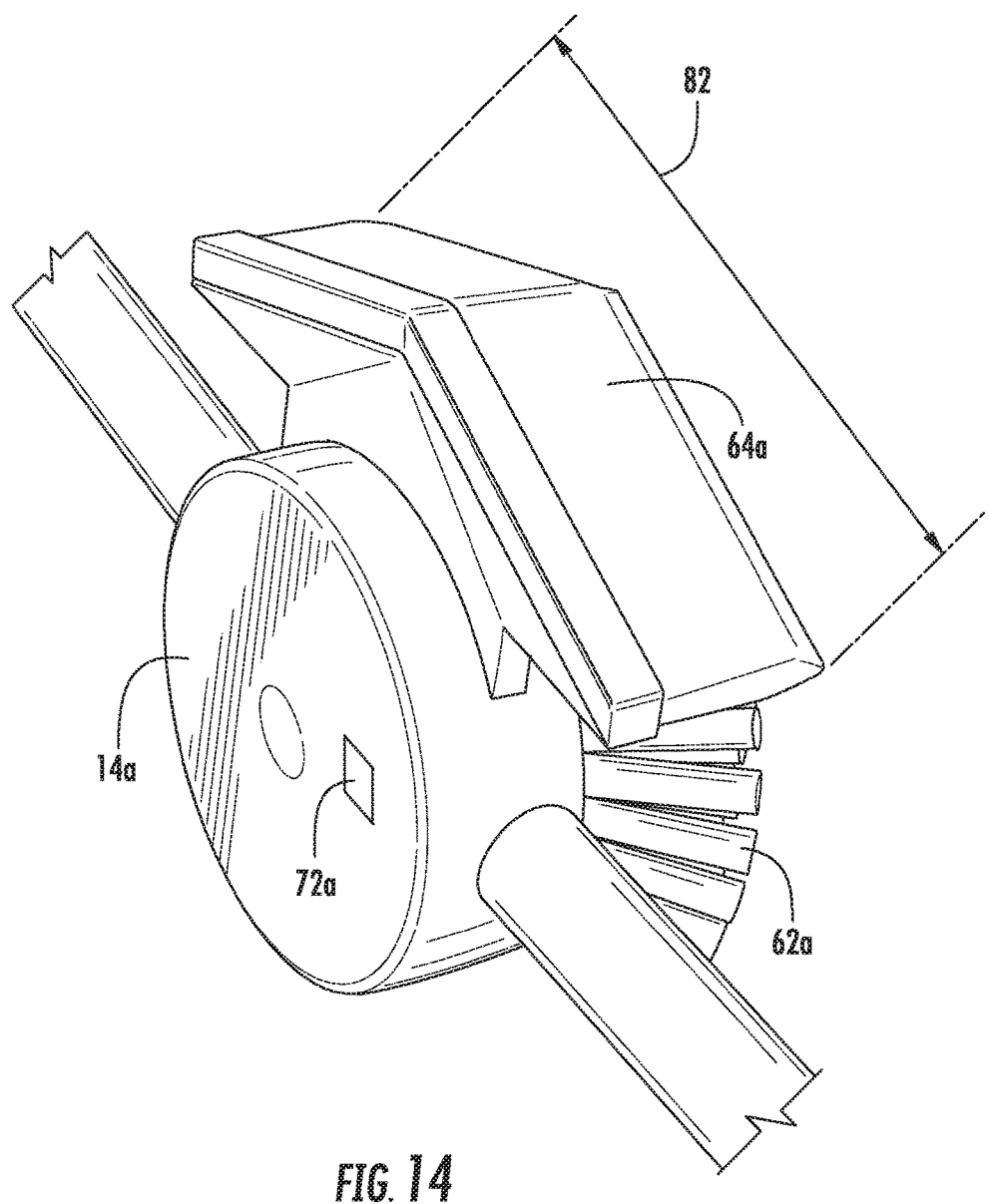
FIG. 14 illustrates the cleaning head of the second embodiment of the windshield touch and clean system as shown in FIG. 13.

Referring now to FIGS. 13 and 14, a second embodiment of the windshield touch and clean system 10a is shown. Instead of the cleaning head 14a being controlled by two extension members 16, 18, the cleaning head 14a is controlled by an X-Y gantry system. The left and right sides of the windshield 12 may have left and right tracks. These tracks 76, 78 receive a horizontal member 80, and more particularly, opposed end portions of the horizontal member 80. The tracks are operative to lift the horizontal member 80 up and down the tracks 76, 78 on the windshield 12. By way of example and not limitation, the left and right tracks 76, 78 may be retrofitted with a linear micro motor that lifts the horizontal member 80 up and down the tracks 76, 80. When the windshield wiper system 10a is traversed to a stored position, the tracks extend downward below the hood 38 so that the horizontal member 80 and the cleaning head 14a can be tucked under the hood and out of sight.

If the left and right tracks 76, 78 are parallel to each other, then the horizontal member may have a fixed width 82. However, if the left and right tracks 76, 78 are skewed with respect to each other. For example, the upper side of the tracks 76, 78 are closer to each other or have a smaller width 82 compared to a lower side of the tracks 76, 78. In this case, the horizontal member 80 may have an adjustable width 82. The adjustment in the width 82 of the horizontal member 80 may come in the form of a telescoping rod on the passenger side of the horizontal member 80. It is also contemplated that the telescoping feature of the horizontal member 80 may be formed on the driver side of the horizontal member 80. The cleaning head 14a may be traversed left and right along the horizontal member 80 so that the cleaning head 14a can reach the entire surface area of the windshield 12 for cleaning.

The windshield touch and clean system 10a may operate in the same fashion as that of the windshield touch and clean system 10 except that the cleaning head 14a is traversed over the windshield 10 with the gantry system instead of two extension members 16, 18 connected with articulating joints 20, 22. Moreover, the rubber wiper 64a has an arrow configuration compared to the straight linear configuration shown in respect to the windshield touch and clean system 10. The rubber wiper 64a is also disposed above the bristles 62a of the cleaning head 14a. Preferably a width 82 of the rubber wiper 64a is about as wide as a diameter of the bristles 62a. Also, the width 82 may be about 4 to 12 inches wide.

The horizontal member 80 may be a bar with telescoping portions on either the passenger side with the driver side when the tracks 76, 78 are skewed with respect to each other. If the tracks and 76, 78 are parallel with respect to each other, then the horizontal member 80 may be a fixed length. However, it is also contemplated that the horizontal member 80 may be a belt driven structure. The belt driven structure comprises of a circular belt that runs on pulleys. The pulleys may be located adjacent the tracks 76, 78 and be operative to be traversed up and down the tracks 76, 78. The cleaning head 14a is fixedly attached to the belt. In order to traverse the cleaning head 14a in the left and right directions, the pulleys are rotated to move the belt, and thus the cleaning head 14a in the left and right directions.

Figure 15:
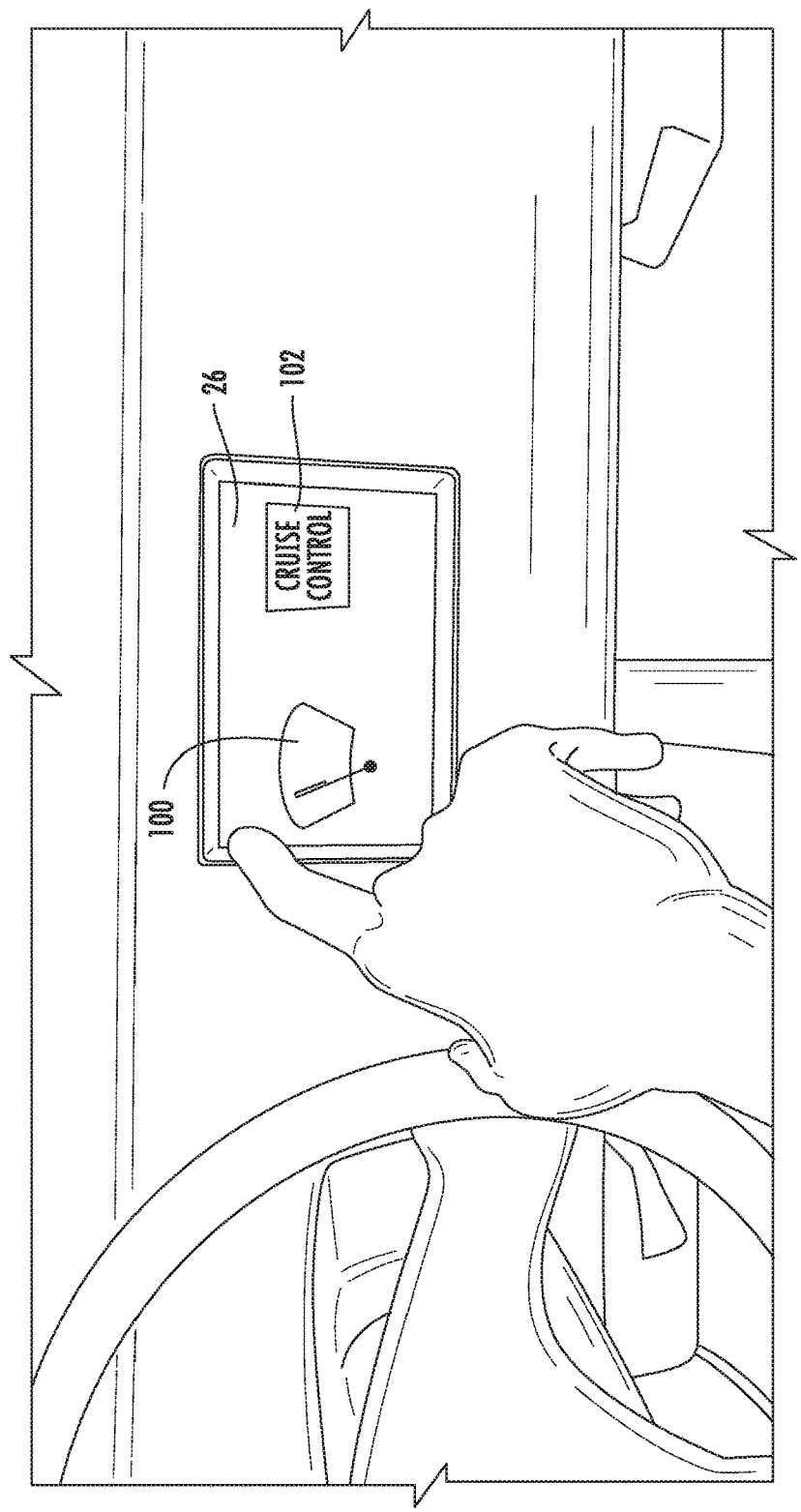
FIG. 15 is an illustration of the display with icons for the windshield touch and clean system.
Figure 16:
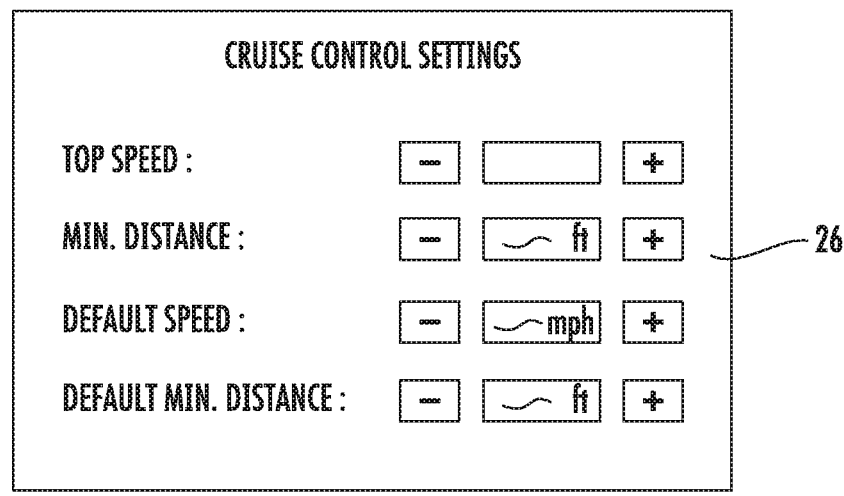
FIG. 16 is an illustration of the display with controls for a cruise control feature.
Figure 17:
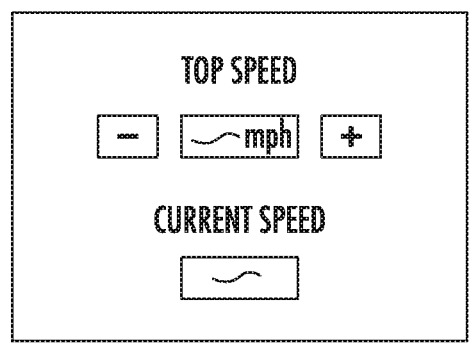
FIG. 17 is an illustration of the display with additional controls for the cruise control feature.
Figure 19A:
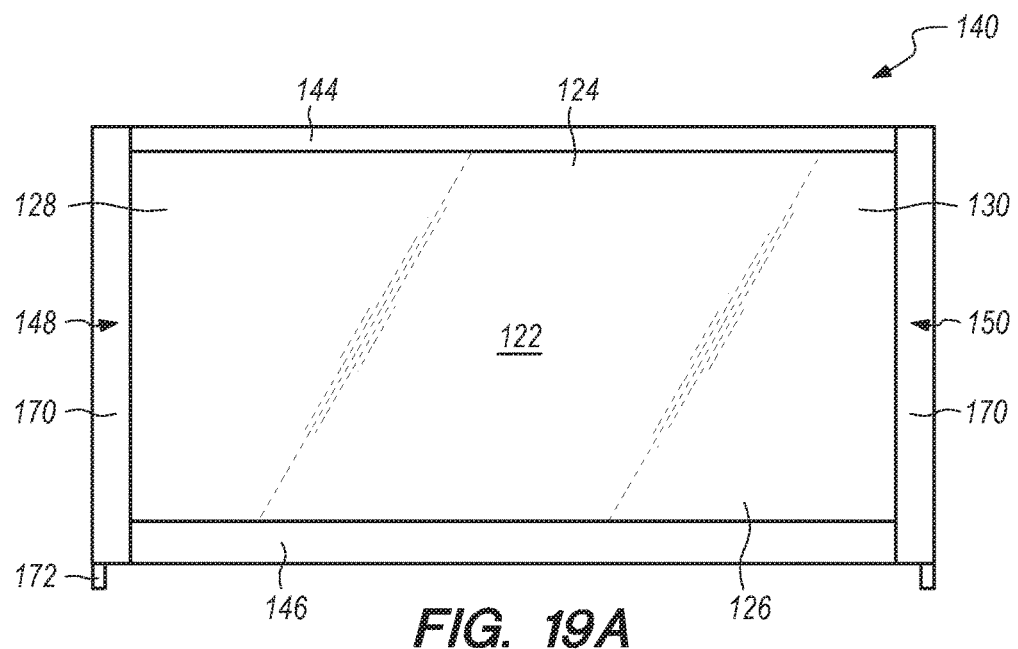
FIG. 19A is a top view of a frame enclosing an improved cleaning apparatus.
Figure 19B:
FIG. 19B is a bottom view of the frame of FIG. 19A.
Figure 19C:
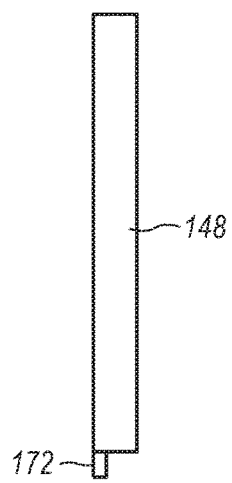
FIG. 19C is a left side view of the frame of FIG. 19A.
Figure 20:
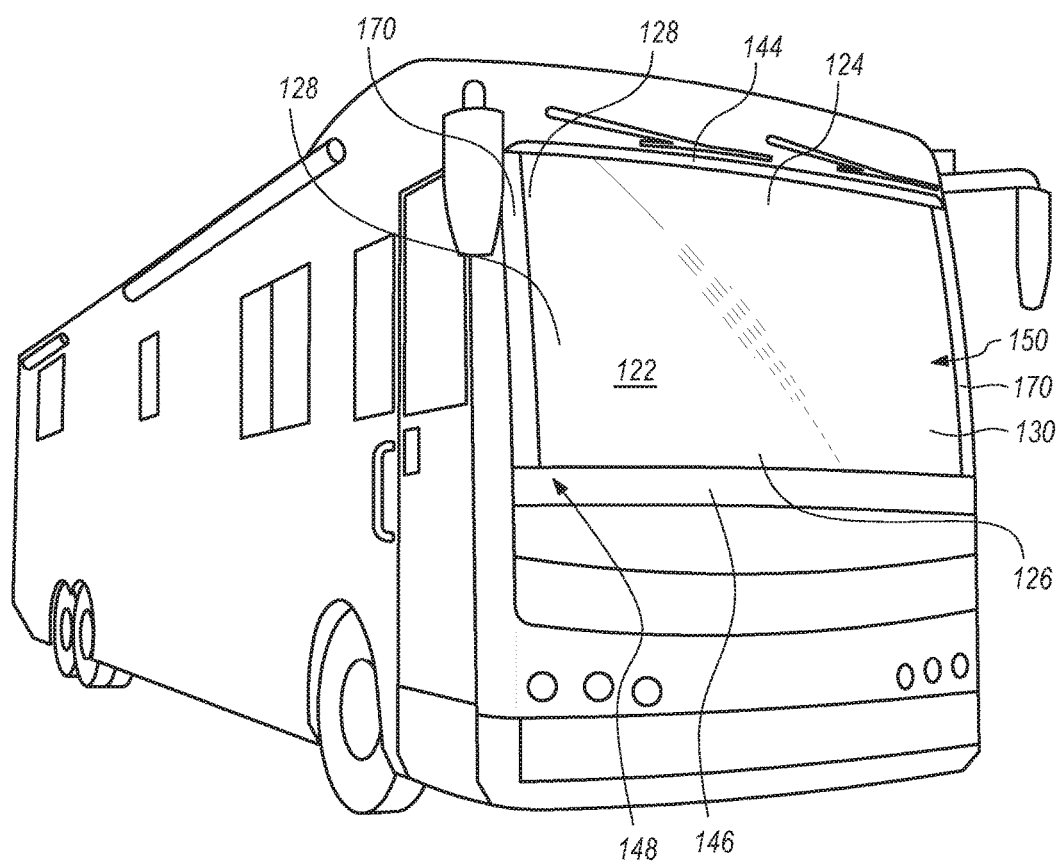
FIG. 20 is a left side perspective view of a motor vehicle having the frame of FIG. 19A encircling the vehicle's windshield.
Figure 21:
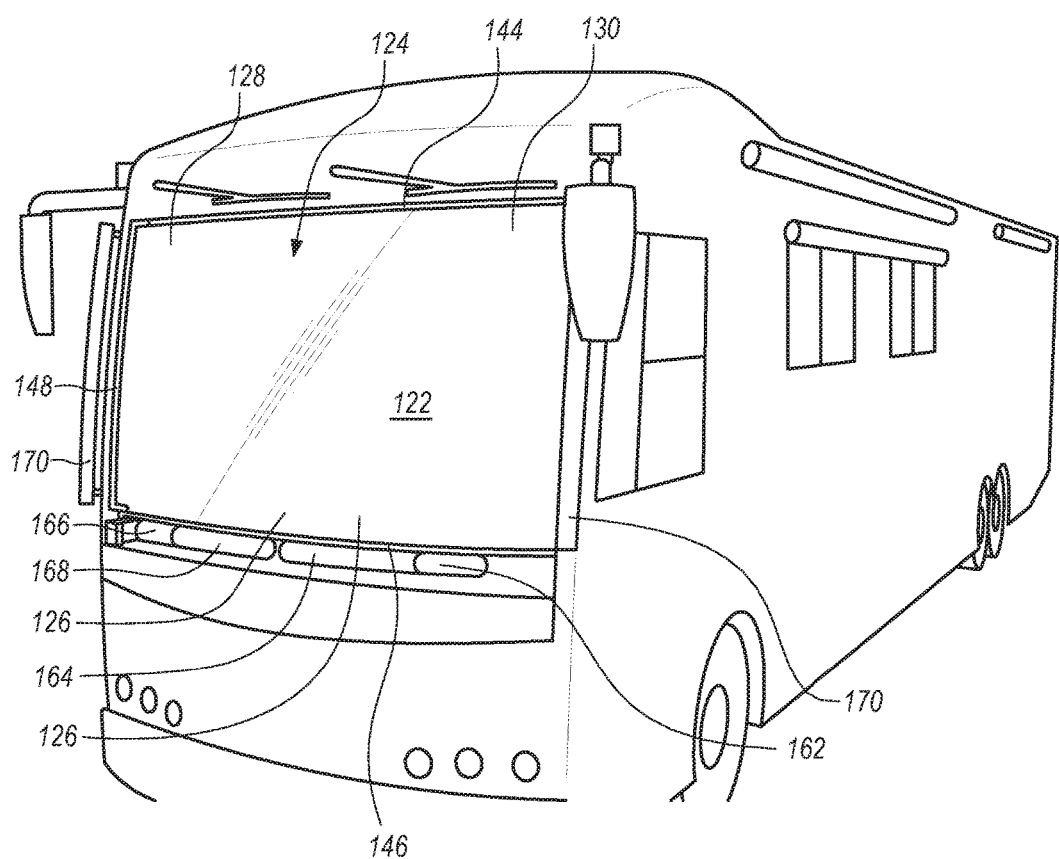
FIG. 21 is right side perspective view of the windshield of FIG. 20 with covers on the side frames in an open position.
Figure 22:
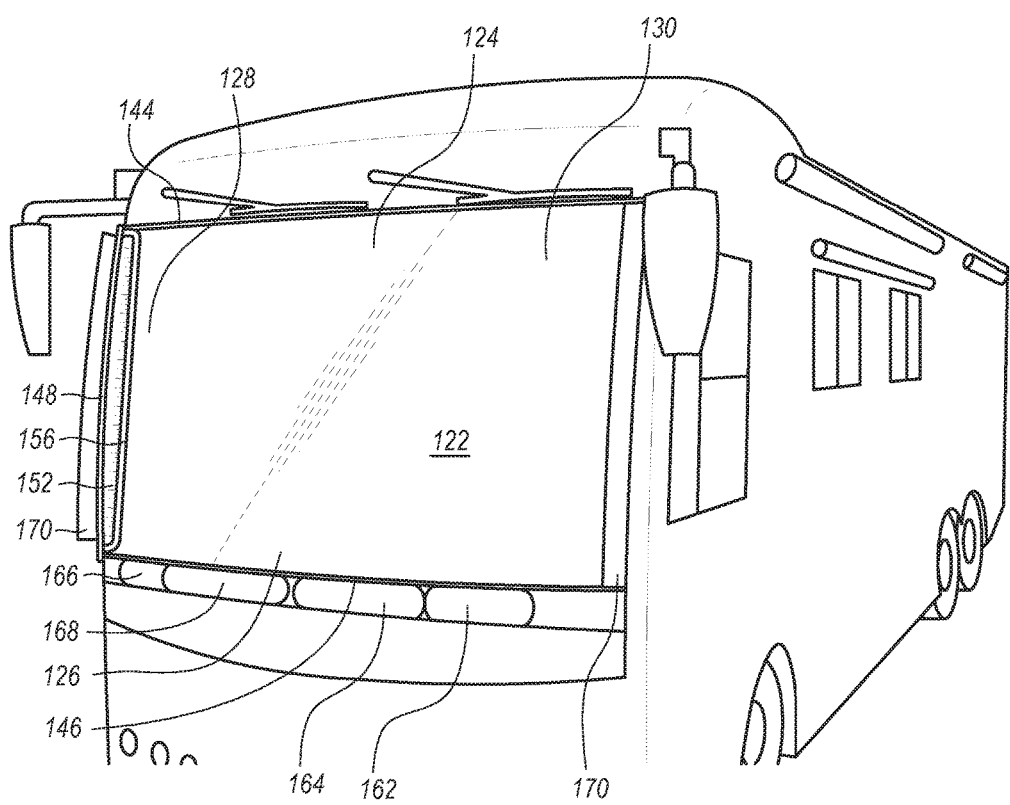
FIG. 22 is a right side perspective view of windshield of FIG. 21 with the top and bottom frame covers removed, the wiper blade not contacting the windshield, a rotatable brush contacting the windshield, a spray bar adjacent the brush and ready to start cleaning the windshield.
Figure 23:
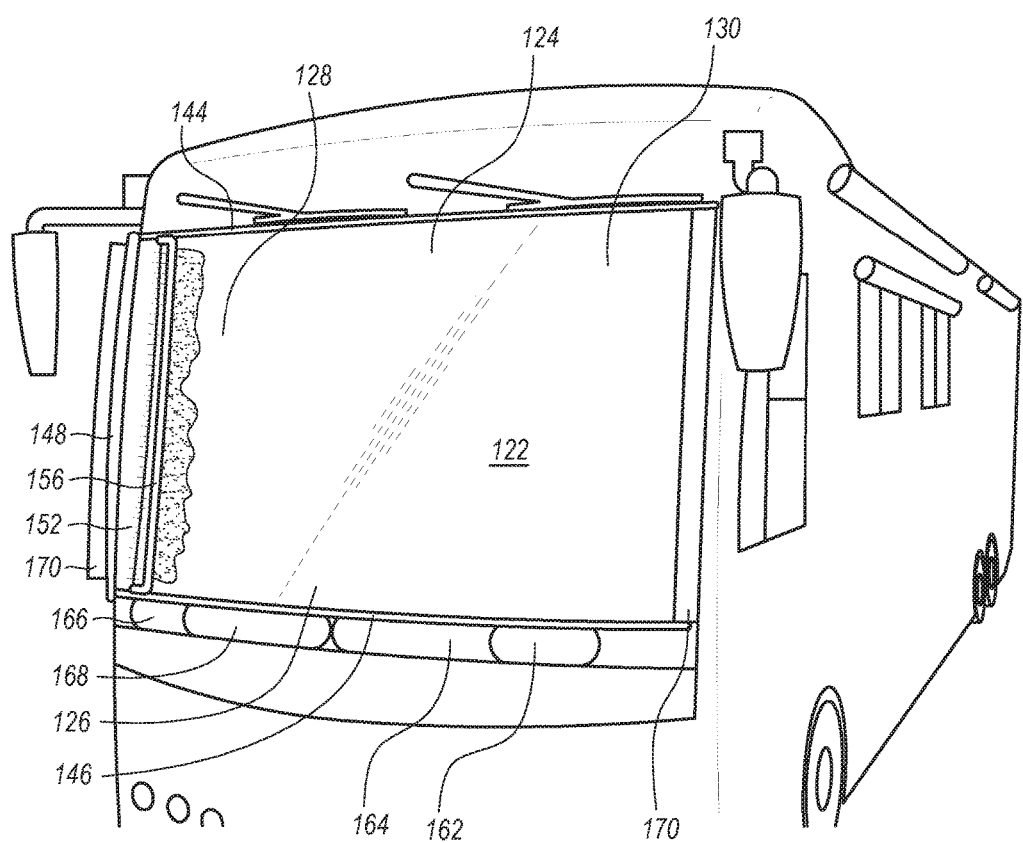
FIG. 23 is a right side perspective view of windshield of FIG. 21 with the top and bottom frame covers removed, the wiper blade not contacting the windshield, a rotating brush and a spray bar spraying water by the brush as the cleaning apparatus moves away from the starting side of the frame and windshield toward a return side of the frame and windshield.
Figure 24:
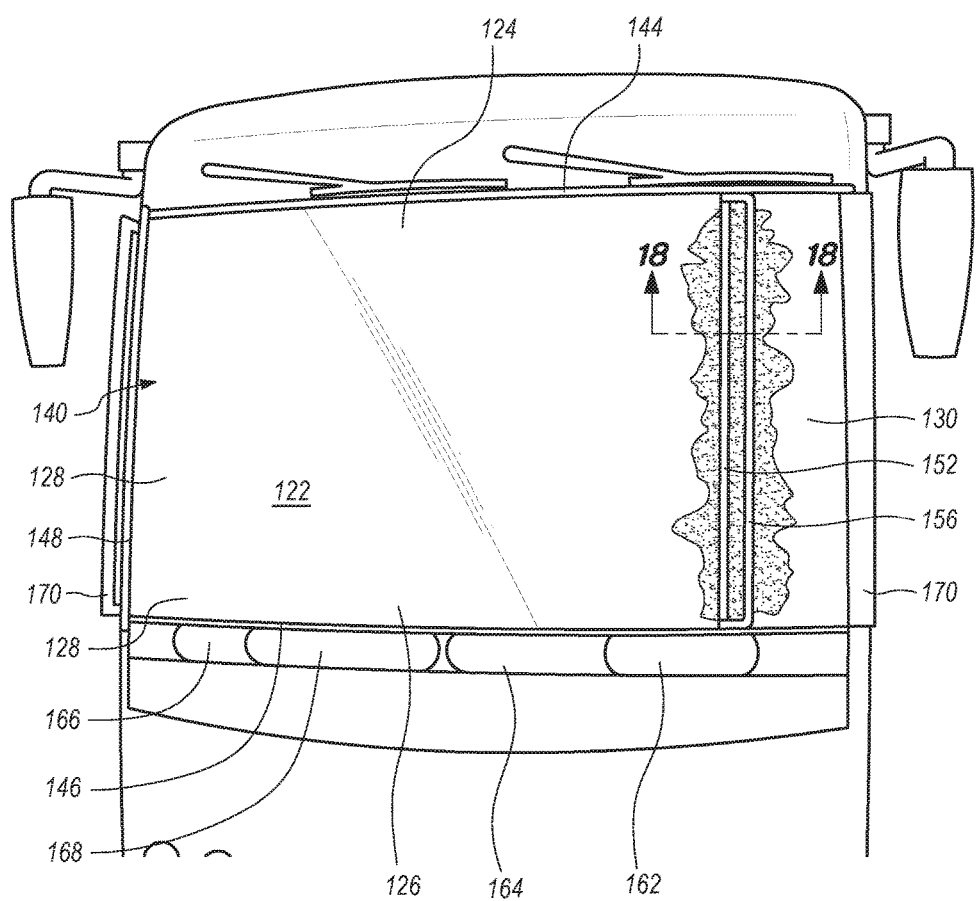
FIG. 24 is a right side perspective view of windshield of FIG. 23 with the top and bottom frame covers removed, the rotating brush and spray bar approaching the return side of the frame and windshield.
Figure 25:
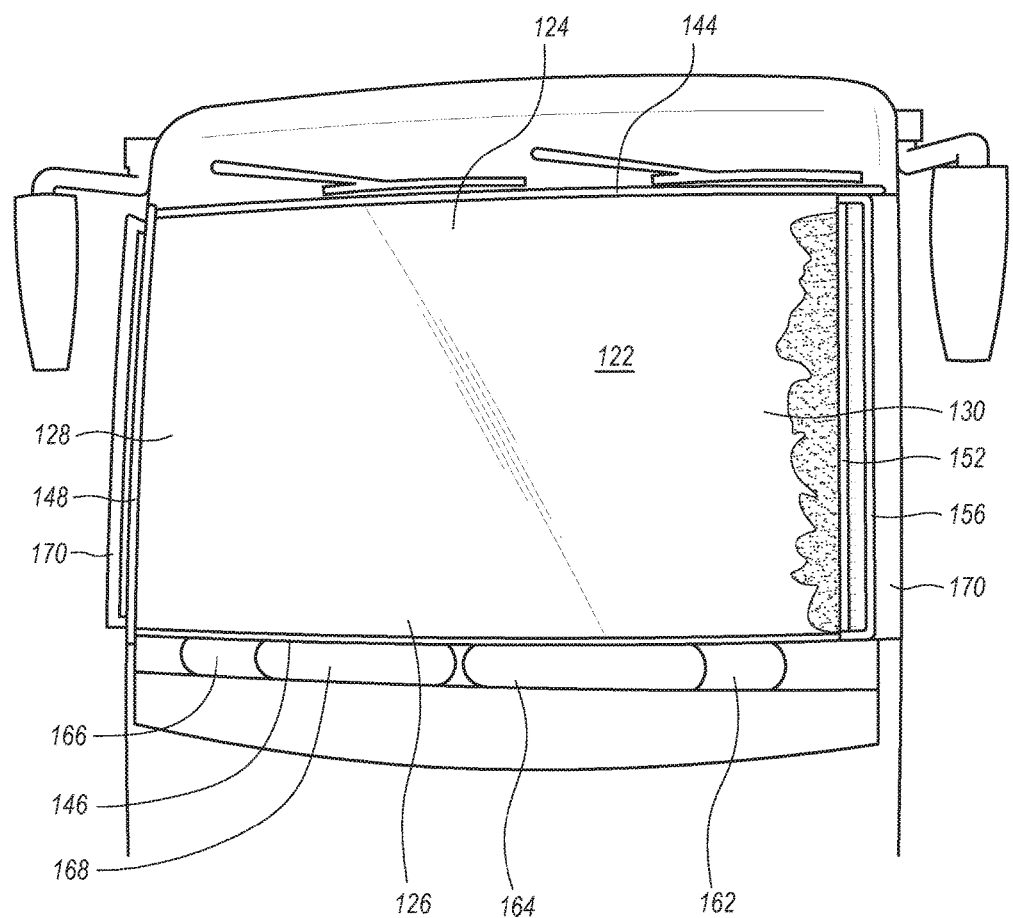
FIG. 25 is a right side perspective view of windshield of FIG. 21 with the top and bottom frame covers removed and with the spray bar over the return side cover of the frame and with the rotating brush at the return side of the windshield.
Figure 26:
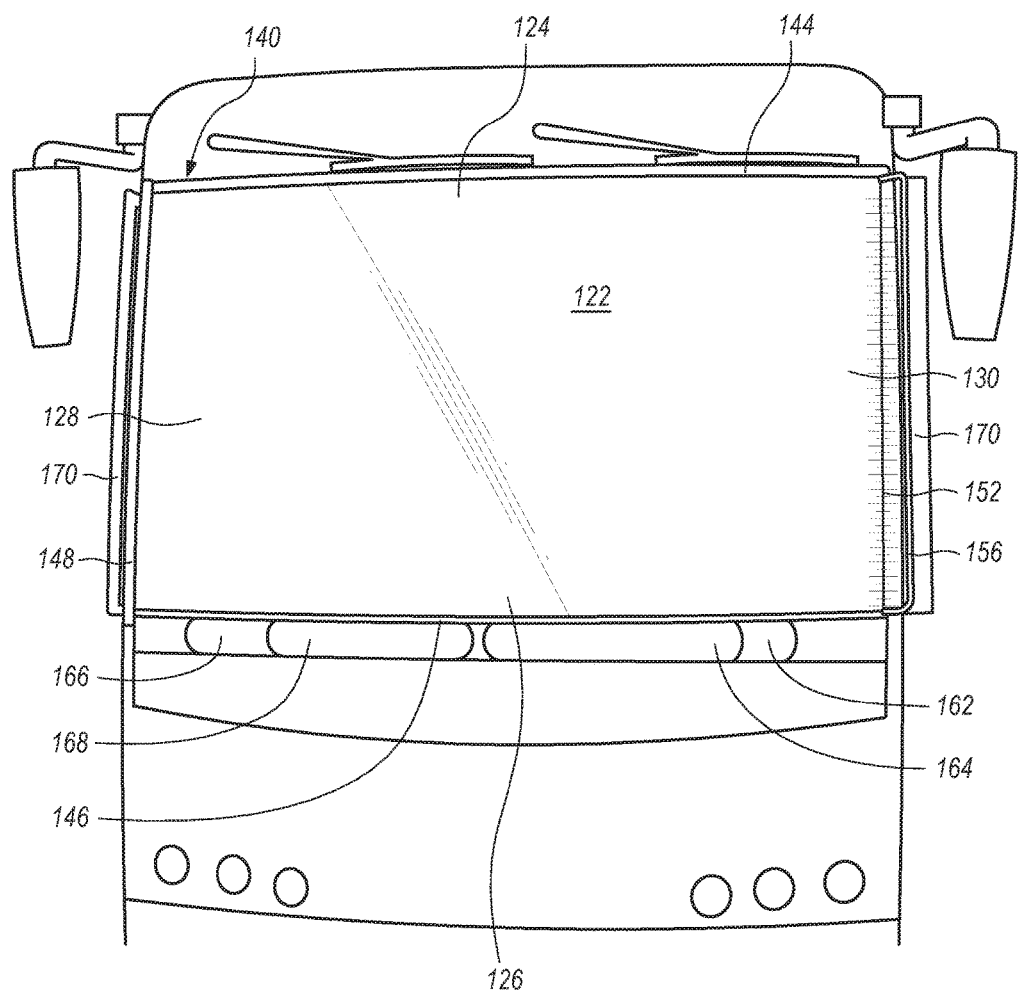
FIG. 26 is a right side perspective view of windshield of FIG. 25, with the brush no longer rotating.
Figure 27:
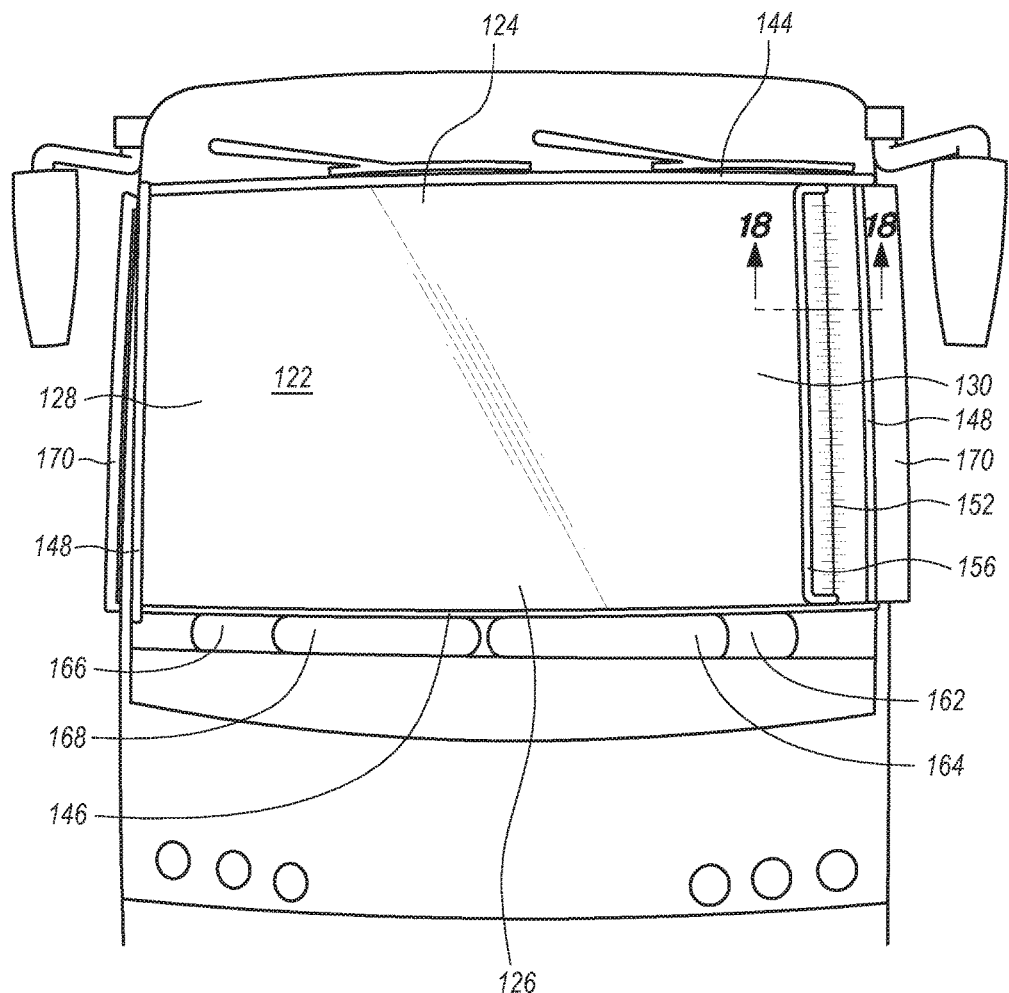
FIG. 27 is a right side perspective view of windshield of FIG. 21 with the top and bottom frame covers removed, the brush not rotating and not contacting the windshield, and the spray bar adjacent the wiper blade to blow air onto the windshield by the wiper blade which is against the windshield, and ready to move from the return side of the windshield and return side frame toward the starting side of the windshield and starting side frame.
Figure 28:
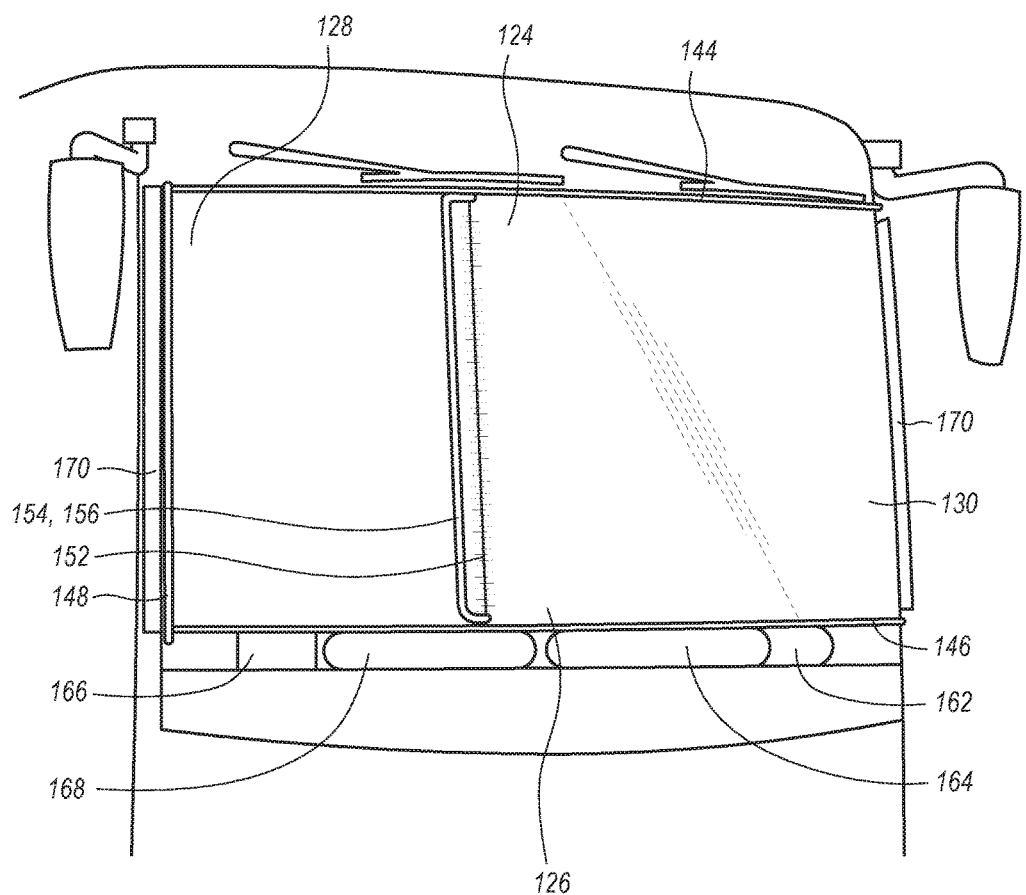
FIG. 28 is a right side perspective view of windshield of FIG. 21 with the top and bottom frame covers removed, the brush not rotating and not contacting the windshield, the spray bar adjacent the wiper blade to blow air onto the windshield with the wiper blade which is against the windshield and ready to move from the return side of the windshield and return side frame toward the starting side of the windshield and starting side frame.
Figure 29:
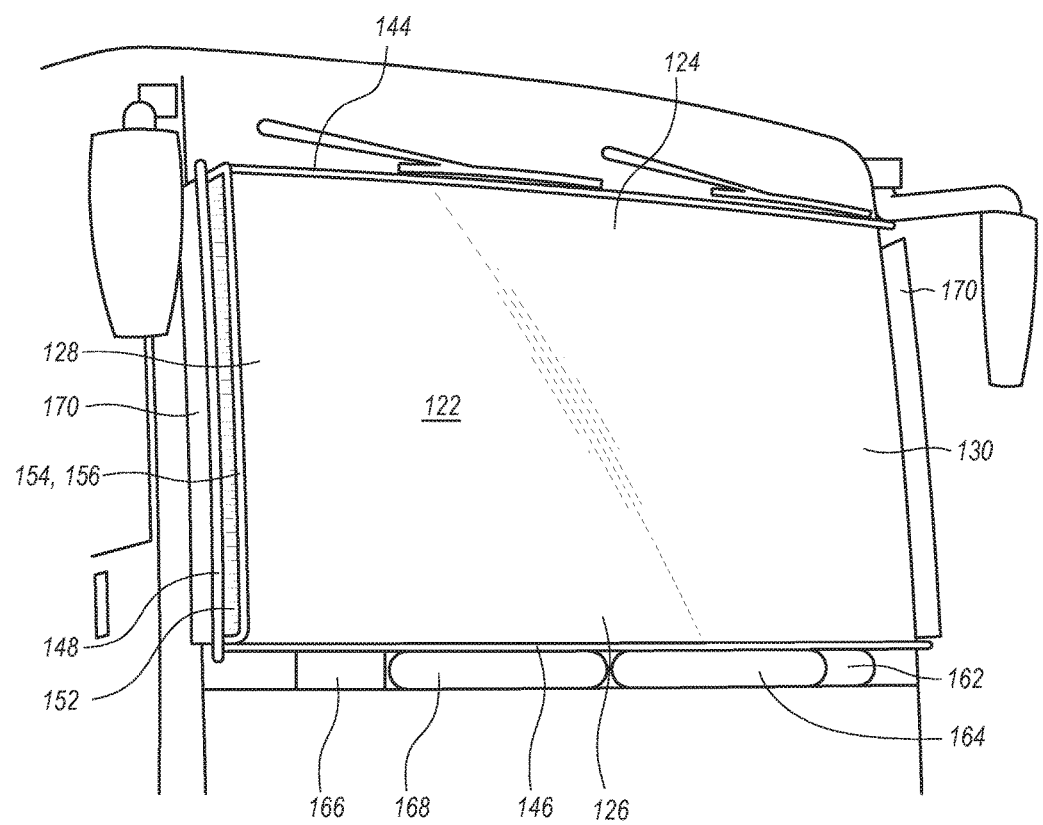
FIG. 29 is a left side perspective view of windshield of FIG. 21 with the top and bottom frame covers removed and the windshield now cleaned by the apparatus of FIG. 28, the brush is not rotating, no air or washer fluid is flowing and the apparatus is and ready for storage.
Figure 30:
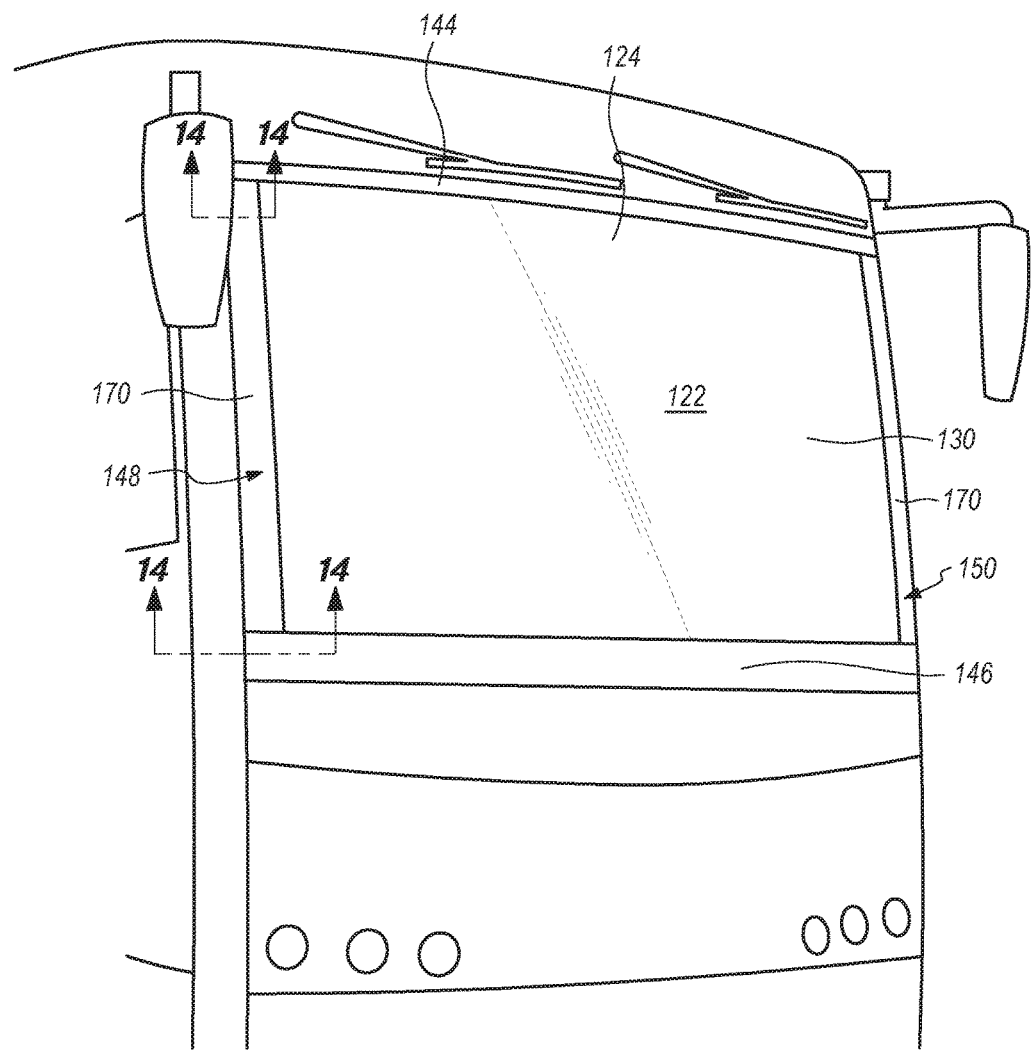
FIG. 30 is a left side perspective view of the windshield of FIG. 20 after cleaning as in FIGS. 21-29, with the cleaning apparatus stored in the starting side frame and the starting side frame cover closed.

Referring now to FIGS. 15-17, the display 26 which may be touch sensitive may also illustrate the windshield 12 as an icon 100 which can be depressed or touched in order to activate the windshield touch and clean system 10. When the windshield icon 100 is depressed, the windshield cleaner (e.g. cleaning head 14, 14a) may begin to clean the windshield 12. The icon of the windshield 12 may be programmed to clean a primary field of view of the windshield when the icon of the windshield 12 is depressed once. When the windshield icon is depressed a second time with the time delay between the first and second depressions being equal or great than a momentary pause such as one second or more, this may deactivate the windshield cleaner so that the windshield cleaner is traversed to a stored position.

As a further alternative to the preprogrammed nature of the icon of the windshield 12, it is also contemplated that the depression of the icon of the windshield 12 may be operative to clean a driver-side half of the windshield 12 or a passenger side half of the windshield 12. Alternatively, it is also contemplated that the depression of the icon of the windshield 12 may be operative to clean the entire surface area of the windshield 12 and not just its primary field of view.

More particularly, the display 26 may also illustrate the windshield cleaner icon 100. The display 26 may be in electrical communication with the computer 24 of the automobile. The computer may control the windshield touch and clean system 10 and may be integral with the on-board computer of the automobile or may be an add-on computer that may integrate with the on-board computer. The windshield touch and clean system 10 may provide for a spot cleaning function as well as an entire windshield cleaning function. It is also contemplated that the windshield touch and clean system may include a windshield wiper with windshield blades that rotate about a pivot point(s). The computer 24 may also control the windshield blades of the windshield wiper system. In this regard, when the windshield cleaner icon 100 is displayed, the user may depress the windshield cleaner icon 100 on the touch sensitive display 26. Upon depression, the display may send a signal to the computer 24. The computer may send a signal to the motor 32 to rotate the wiper blades or operate the windshield cleaner for wiping and cleaning the windshield of the automobile. Additionally, the windshield cleaner icon 100 when either the articulating joint system or the gantry system is installed on the automobile may, when depressed, operate the articulating joint system or the gantry system whichever is installed on the automobile to clean the windshield of the automobile.

In another aspect, the display 26 may also have a cruise control icon 102 which when depressed may activate the cruise control program of the automobile. More particularly, when the cruise control icon is depressed, the current speed of the car or automobile may be maintained by the cruise control program of the automobile. The cruise control program of the automobile may be loaded on an on-board computer of the automobile. By on-board, this may include a computer that is integral or an add-on to the computer of the automobile that controls the other functions (e.g., door locks, engine control system, etc.) of the automobile. By way of example and not limitation, if an add-on computer performs the cruise control program, that add-on computer may be a smart phone. In this manner, the smart phone processor may perform the cruise control program. Alternatively, the smart phone processor/computer may work in conjunction with the on-board computer that performs the cruise control program.

The cruise control program may include an active cruise control feature wherein the automobile is set to a particular speed or set to a particular maximum speed but the automobile may be slowed down if a distance sensor on the automobile senses a vehicle in front of the automobile closer than a minimum allowable distance. When the cruise control icon 102 is depressed, the display 26 may send an electronic signal to the computer 24 of the automobile to activate the cruise control program loaded on the automobile computer. If the cruise control function is already activated, depression of the cruise control icon 102 may cause the display 26 to send an electronic signal to the computer 24 to deactivate the cruise control function. If the first and second depressions of the cruise control icon 102 are more than a momentary pause then each depression of the cruise control icon 102 may be used to activate and deactivate the cruise control program or feature. However, if the cruise control icon 102 is depressed in two quick successions so that the time between the two depressions is less than a momentary pause, a cruise control settings menu may be displayed on the display. In this regard, the cruise control icon 102 may also be utilized to set customizable settings for the cruise control program. These settings include but are not limited to a top speed of the vehicle when the cruise control feature is activated, a minimum distance with a vehicle in front of the automobile, a default speed and a default minimum distance with the vehicle in front of the automobile.

The cruise control feature may allow the automobile speed to be set to a particular speed. The speed may be either the current speed of the automobile or an adjustable max speed controllable by the user. If the cruise control function allow only for a current speed of the automobile to be set, the cruise control function may operate so that the current speed of the automobile is maintained when the cruise control feature activated. The cruise control feature may allow for an adjustment in the automobile speed controllable by the user. Upon depression of the cruise control icon 102, the cruise control function may be activated so that the current speed of the automobile is maintained and the display may also show a top speed of the automobile with plus and minus icons used to increase or decrease the target speed. If the top speed is increased or decreased, the automobile is accelerated or decelerated based on the relative target speed of the automobile and the actual speed of the automobile. Initially, when the cruise control function is activated upon depression of the cruise control icon 102, the target speed may be set to the current speed of the automobile.

The cruise control function may have customizable settings as discussed above. The customizable settings may be accessed through a cruise control setting icon or it is also contemplated that the customizable settings may be accessed through a double tapping action of the cruise control icon 102 on the display. When the cruise control function has an active cruise control feature, the customizable settings may include a setting for top speed of the automobile. The top speed of the automobile may be set to between 65 mph and 100 mph. For example, the top speed of the automobile under control of the cruise control function may be below 70 mph. In this regard, the setting for top speed of the automobile may be no greater than the range stated above. The customizable settings may also include a setting for a minimum distance with the vehicle in front of the automobile. The speed of the automobile may be reduced as the automobile approaches of vehicle. A proximity sensor of the automobile may sense that it is coming closer to a vehicle in front of it. The proximity sensor is capable of determining a distance between the automobile and the vehicle in front of it. The minimum distance with the vehicle in front of the automobile may be equal to a stopping distance of the automobile upon full application of the brakes of the automobile.

As used herein, the relative directions up and down are with respect to the direction of gravity. As used herein, the following part numbers refer to the following parts: 120—cleaning device; 122—windshield; 124—top of windshield; 126—bottom of windshield; 128—starting side of windshield; 130—return side of windshield; 132—top carrier; 134—bottom carrier; 136—top tracks; 138—bottom tracks; 140—frame; 144—top frame; 146—bottom frame; 148—starting side frame; 150—return side frame; 152—brush; 153—motor; 154—wiper blade; 156—spray bar; 158a, 158b—first and second flow channel; 160a, 160b—first and second spray nozzles; 162—pump; 164—container for wash fluid; 166—air compressor; 168—air storage container; 170—side frame cover and 172—drain. The cleaning device 120 described below has been described with the cleaning device being deployed from a front side of the vehicle or vehicle windshield. However, it is also contemplated that the mechanisms and structure described below in support of a front deployed method and structure may be modified so that the cleaning device 120 is deployed from the side of the vehicle windshield or vehicle so that the width of the windshield is not reduced to accommodate the cleaning device 120. For example, the top and bottom carriers 132, 134 may be curved so as to be routed from the side of the vehicle windshield or vehicle. Moreover, the windshield 122 may be flat or curved. The windshield cleaner may be sized so that the entire windshield or any select portion thereof can be cleaned with the windshield cleaner.

Referring to FIGS. 18-31, a method and apparatus are disclosed for washing surfaces to which the apparatus is mounted, with special application for washing the windshield 122 of a bus or RV having a top 124, an opposing bottom 126, a starting side 128 and a return side 130 of the windshield. The cleaning device 120 advantageously moves from the starting side 128 to the return side 130 and back to the starting side 128. The cleaning device 120 advantageously extends across the windshield between the top and bottom sides 124, 128 and may be connected to top and bottom carriers 132, 134 which move along top and bottom tracks 136, 138 as the cleaning device moves from the starting side 128 to the return side 130 and back.

Advantageously, the cleaning device 120 is contained in a frame 140 having a top frame 144 which contains the top tracks 136, and an opposing bottom frame 146 which contains the bottom tracks 138. The frame 140 may have starting side frame 148 and an opposing return side frame 150. Advantageously, the starting side frame 148 and return side frame 150 extend between the top and bottom frames 144, 146 at opposing ends of the frame 140. The various parts of the frame 140 advantageously have cross-sectional shapes that are square in cross-section, where square includes rectangular cross-sectional shapes.

The cleaning device 120 has components to clean and dry the windshield 122 and these components may include a brush 152 to wash and scrub the windshield, a wiper blade 154 to scrape water, and wash fluid and debris off the windshield, and at least one spray bar 156 to spray wash fluid onto the windshield and/or brush and to spray bar 156 and to spray air onto the windshield during drying. Advantageously all the cleaning components such as the brush 152, wiper blade 154 and spray bar 156 have opposing ends that are connected to a different one of the carriers 132, 134 so they extend across a height of the windshield 122 and move with the carriers from side to side across the windshield.

The brush 152 may comprise a rotatable, cylindrical brush and may be made of radially extending fibers or bristles and preferably has a predetermined, un-deformed diameter. As used herein, the rotatable brush rotates more than one revolution in one direction rather than oscillates back and forth less than one revolution. The brush 152 may comprise a plurality of radially mounted, elongated but flexible members that hang downward with gravity and that use centrifugal force arising from rotation to cause the flexible members to resemble a cylindrical brush. A brush 152 made of a plurality of radially extending, polymer bristles extending from a central cylindrical core of about 0.5-inch diameter, with an overall diameter of 2-3 inches is believed suitable. The brush 152 is rotated by various mechanisms, including by a motor 153 which is advantageously an electric motor or a fluid driven motor as described in U.S. Pat. No. 8,032,976. When an electric motor 153 is use, the motor may be connected to one of the carriers 132, 134 to rotate the brush 152 directly or through a gear mechanism. An electric motor 153 mounted on and moving with the bottom carrier 134 is believed suitable. When a fluid drive is used to rotate brush 152, the fluid motor may be as described in the above U.S. Pat. No. 8,032,976, or it may be the fluid pump 162 or the air compressor 166 (or air storage container 168), with an optional valve on one of the carriers 132, 134 or elsewhere regulating the fluid flow.

Whether the rotating mechanism is a motor electrically powered through a conductive wire or fluid powered as by air or washer fluid through a supply tube, the fluid supply tube or electrical supply wires may extend from one side frame 148, 150 toward the opposing side frame 150, 148, and are advantageously contained in one of the top or bottom frames 144, 146. Electrical wires or fluid tubes extending from the starting side frame 148 and resiliently tethered to the return side frame 150 and contained in the bottom frame—are believed suitable. The resilient tether is believed to help keep the tubes or wires from tangling during reciprocal motion of the brush 53. It is also believed suitable to have the electrical wires or fluid supply tubes extending from the middle of the top or bottom frames and tethered to one of the starting side or return side frames to help keep the tubes or wires from tangling during reciprocating movement of the brush 152.

The wiper blade 154 is an elongated, flexible, rubber or elastomeric blade of the type used in windshield wipers or a squeegee. The wiper blade 154 typically has a triangular cross-sectional shape narrowest at the tip which abuts the windshield 122 during use. The wiper blade, when pressed against the windshield 122 and moved from the return side 130 of the windshield toward the starting side 128 of the windshield, pushes water, washing fluid and debris off the windshield surface to leave an effectively dry windshield when things work properly. The angle of the wiper blade 154 relative to the outer surface of the windshield 122 will vary, with an angle of about 70-90° believed suitable, and with the flexible tip of the wiper blade lagging behind the thicker mounting portion of the blade as the blade moves during use. The length of the wiper blade 154 is preferably aligned in the vertical plane, but could be inclined thereto with the top more inclined toward the starting side frame 148 to direct the water toward the bottom frame 146.

The spray bar 156 may comprise a single rotating bar having separate, first and second flow channels 158a, 158b (FIG. 18), each flow channel having a respective first and second plurality spray nozzles 160a, 160b so nozzles 160a are associate first flow channel 158a, and nozzles 160b are associated with second flow channel 158b. The first flow channel 158a is in fluid communication with a source of pressurized wash fluid, which may comprise pump 162 that is in fluid communication with a source of wash fluid or cleaning fluid, such as container 164. As desired, the pump 162 may draw soap from one container and water from another container and mix them for deliver to flow channel 158a, but preferably a premixed was fluid is provided in container 164, with the pump passing the wash fluid to the first flow channel 158a under a predetermined pressure. A pressure of a few psi is believed suitable for use, about 2-10 psi. While higher pressures are believed usable, it is believed desirable to avoid pressures high enough to require high pressure fittings and seals as those may shorten the system's life. Thus, a pressure less than about 20 psi is believed desirable. As used herein, the term "less than about 20 psi" may include zero, but that would not generate any pressure so the term "a pressure less than about 20 psi" refers to a non-zero pressure sufficient to function in the device described herein. The water, liquid soap or the mixture of water and soap may be heated with a heater (e.g., thermos exchanger with the engine of the vehicle, electric heater, etc.) so that heated mixture of water and soap may be sprayed onto the windshield. If the windshield is frosted or has ice frozen over it, then the heat liquid mixture may be utilized to defrost the windshield.

The second flow channel 158b is in fluid communication with a source of pressurized air, which may comprise an air compressor 166, or an air storage container 168, or both. If the air compressor is utilized, then the air compressor may run off of power from the vehicle engine. Alternatively, in lieu of a separate air compressor dedicated for the windshield cleaner, it is also contemplated that the windshield cleaner may utilize the air compressor of the vehicle (e.g., air ride, etc.). An air storage container 168 is desirable as it may provide a high air pressure with little or no delay, but the pressurized air has its own storage issues and has limited capacity. The use of both a pressurized container 168 and an air compressor 166 allows a prompt supply of pressurized air and a continuing supply. A pressure sufficient to blow water droplets off the windshield 122 is desirable, with a pressure of about 10-40 psi believed desirable. Higher pressures are believed acceptable for use, but the higher pressures may involve more complex seals and protective measures if a high-pressure container 168 is used.

The fluid supply tubes to the first and second flow channels 158a, 158b may arranged the same as described for the electrical wires and fluid supply to the brush 152. Advantageously, the supply tubes comprise flexible elastomeric tubes that extend from the starting side frame 148 or the middle of the bottom frame 146, with the supply tubs tethered to one of the return side frame 150 or starting side frame 148 to help avoid tangling.

During use of the cleaning system 120, the brush 152 rotates against the windshield 122 as the carriers 132, 134 move the brush from the starting side frame 148 to the return side frame 150, with the brush preferably not rotating against the windshield as the carriers move the brush back to the starting side frame 148. During use, the spray bar 156 has first spray nozzles 61a adjacent the windshield and adjacent the rotating brush 152 and between the rotating brush and the return side 150 during washing. Shortly before or during the return movement of the carriers 132, 134 from the return side frame 150 to the starting side 148, the spray bar 156 rotates to the opposing side of the brush 152 so the second spray nozzles 160b are adjacent the windshield 122 and adjacent the wiper blade 154, while the brush 152 is lifted away from the surface of windshield 122 and preferably does not rotate. During use, the wiper blade 154 does not contact and scrape against the windshield 122 as the carriers 132, 134 move the wiper blade from the starting side frame 148 to the return side frame 150, with the wiper blade urged against the windshield 122 to scrape water from the windshield as the carriers move the wiper blade from the return side frame 150 to the starting side frame 148.

The engagement and disengagement of the brush 152 and wiper blade 154 with the windshield may be achieved by various mechanisms, including rotating a support member having the brush 152 and wiper blade 154 on opposing, first and second ends of the support member, so that the wiper blade 154 is away from the windshield 122 when the brush 152 engages the windshield, and the brush 152 is away from the windshield when the wiper blade 154 engages the windshield. The brush 152 and wiper blade 154 may be positioned various ways, including separate linear or rotary actuators (e.g., solenoids or motors) connected to one or both carriers 132, 134 and further connected to the brush 152 and/or wiper blade 154 so the brush and blade may be moved separately toward or away from the windshield or move simultaneously in opposing directions toward or away from the windshield. The movement may be achieved, by pneumatic or fluid motors driven by the pump 162, air compressor 166, or air storage container 168. Various cams and cam pins may be connected to one or both of the carriers 132, 134, or on the support member for the brush and wiper blade, or on the top and bottom frames 144, 146 or return side frame 150, to position the brush 152 and wiper blade 154 relative to the windshield 122. Depending on the mechanism used to position the brush 152 and wiper blade 154, various position or actuator sensors may be used to control the mechanisms. A resilient spring may be interposed between the device providing the moving force and the wiper blade 154 and between the device providing the moving force and the brush 152 in order to resiliently urge the brush 152 and wiper blade 154 against the windshield 122.

The spray bar 156 advantageously has a U-shape with opposing ends connected to different ones of the top and bottom carriers 132, 134. The spray bar 156 rotates relative to those carriers 132, 134 to place the first spray nozzles 160a adjacent the brush 152 and windshield either before or as the spray bar moves from the starting side frame 148 toward the return side frame 150. As the spray bar reaches or extends into the return side frame 150 the spray bar rotates to the other side of the brush 152. The rotation may be achieved, by various devices, including pneumatic or fluid motors driven by the pump 162, air compressor 166, or air storage container 168. Electric motors and cam mechanisms are also believed suitable, with cam pins connected to the top or bottom frames 144, 146 or to the return frame 150 engaging portions of the spray bar 156 or a cam member connected to the carrier, to cause rotation of the spray bar adjacent the return frame 150. Depending on the mechanism used to position the spray bar 156, various position or actuator sensors may be used to control the mechanism(s) rotating or positioning the spray bar.

The top and bottom carriers 132, 135 are advantageously sized and configured to fit within the top and bottom frames 144, 146. The carriers 132, 134 advantageously reciprocate along the top and bottom tracks 136, 138 from the starting side of the windshield (or starting side frame) to the return side of the windshield (or return side frame) and back to the starting side of the windshield (or return side frame). The tracks 136, 138 and their respective carriers 132, 134 may take various forms to guide the carriers during use as they reciprocate from the starting side frame 148 to the return side frame 150 and back to the starting side frame 148. The tracks 136, 138 may be the same, or different in construction.

Typically, one of the tracks or carriers has a rolling or sliding contact that is entrapped by the other of the tracks or carriers to guide the movement of the carriers along the tracks. The tracks 136, 138 may take the form of an elongated member with an enlarged portion while the carriers 132, 134 are configured to engage the enlarged portion in a rolling or sliding contact and move along the tracks with the enlarged portion guiding the carrier. Monorails may use this type of system. Conversely, the tracks 136, 138 may form a recess with the carriers 132, 134 having an enlarged portion to engage the recess in a sliding or rolling contact and move along the tracks with the enlarged portion guiding the carrier. One of the tracks and one of the carriers may have one of the above general features, while the other of the tracks and carriers has the other of the above general features, and the orientation of the top and bottom parts may change.

Thus, for example, the bottom track 138 may take the form of a generally horizontally or laterally extending C-shaped track with a generally vertical wheel or wheels on the bottom carrier 134 guided between the short legs of the C-section on the bottom track 138, while the top track 136 may be comprise a generally vertical, C-shaped track with the top carrier 132 having generally vertically oriented wheels and rolling along the bottom, short leg of the C-shaped, top track. Alternatively, the top track could have a construction as described for the bottom track, or vice versa. As a further illustrative example, tracks and rolling and sliding followers as used on sliding glass doors and room dividers are also believed suitable. The carriers 132, 134 and the parts extending between them (brush, wiper blade, spray bar) may be supported by the bottom carrier and guided by the top carrier, or suspended from the top carrier and guided by the bottom carrier, or a combination of the two.

If the tracks 136, 138 do not involve a specific drive mechanism as described below, then a separate movement mechanism may be provided to move the carriers 132, 134 and associated brush 152, wiper blade 154 and spray bar 156 in a reciprocal motion across the windshield and back. A belt or pully system may extend between the starting side frame 148 and return side frame 150, with the belt or pulley connected to one of the top or bottom carriers 132, 134, with a drive motor and control advantageously located in one of the side frames, preferably the starting side frame 148. Other drive mechanisms may be used, including pneumatic drives or fluid drives powered by the air compressor 166 or air storage container 168 or pump 162. A separate electric motor drive could also be provided, powered by the vehicle's battery. The other electrical components and motors described herein are also advantageously powered by and thus in electrical communication with the vehicle's battery.

Some drive mechanisms involve specific drives. One or both of the tracks 136, 138 may comprise a rack gear that may be slightly curved to confirm to the shape of the portion windshield along which the track extends, with a pinion gear connected to one or both of the carriers 132 or 134 guided by the track connected to the carrier. The windshield 122 and tracks, 136, 138 are curved or bowed so the opposing ends of the top and bottom tracks are offset from a middle of the track. A cog wheel and track may be associated with only one or each of the carriers 132, 134. These drive mechanisms lend themselves to use with tracks 136, 138 that are slightly curved to conform to the shape of the adjacent windshield. If straight tracks may be used, then lead screws and ball screws may also be used to move the carrier(s) 132, 134 across the windshield 122 and back to the starting side frame 148.

The starting side frame 148 and return side frame 150 may each have its own cover 170 which are advantageously opened during use and closed when not in use. The top and bottom frames 144, 148 also preferably have similar covers that open during use and closed when not in use, but hose covers are not shown in detail. The starting frame cover 170 covers the starting side frame 148 and cleaning components located therein when not in use. Advantageously, the carriers 132, 134, brush 152, wiper blade 154 and spray bar 156 start and stop their reciprocal motion at the starting side frame 148 and fit within that frame 148 and cover 170 when not in use. Both covers 170 also acts as a splash shields to reduce the amount of washer water the rotating brush 152 splashes to the sides of the vehicle. Water splashing to the side of the windshield 122 may enter the vehicle if a side windshield is open, and may collect on the side of the vehicle or side windshields and create undesirable deposits of dirt and mud. Advantageously, each cover 170 directs any collected washer fluid and debris toward the side frame associated with the cover and a drain 172 is provided at the bottom of the starting side frame 148 and return side frame 150 to allow such collected fluids to be directed by drain tubing toward the bottom of the vehicle where it drips onto the ground on which the vehicle travels.

During use, the covers 170 open on the vehicle side frames 148, 150 and if not already in position, the spray bar 156 moves into its first operating position adjacent the windshield 122 and brush 152. The brush 152 starts rotating and washer fluid is sprayed onto the windshield and/or brush through first spray nozzles 160*a* of the spray bar. One or both of the top and bottom carriers 132, 134 move the rotating brush 152, spray bar 156 and non-contacting wiper blade 154 across the windshield 122 from the starting side 128 of the windshield and the starting side frame 148, toward the return side of the windshield 130 and the return side frame 150. The top and bottom carriers 132, 134 move along the respective top and bottom tracks 136, 138 during this movement. The wiper blade 154 is not in contact with the windshield 122 during this movement. The washing position is shown in solid lines in FIG. 18.

When the spray bar 156 reaches the return side frame 150 the spray bar 156 is rotated about half a turn to a second operating position adjacent the windshield 122 and adjacent the wiper blade 154 and air flows from the second spray nozzles 160*b*. This drying position is shown in broken lines in FIG. 18. The flow of washer fluid to the rotating brush 152 is stopped and the rotating brush is lifted from contact with the windshield while the wiper is placed in contact with the windshield. After spinning a short while to throw off washer fluid from the brush, the rotation of the brush is stopped. The carrier plate(s) 132, 134 then move the wiper blade 154, spray bar 156 and non-rotating, non-contacting brush 152 across the windshield from the return side of the windshield 130 and return side frame 150 to the starting side of the windshield 128 and the starting side frame 148, with the wiper blade and spray nozzles 160b removing washer water and debris from the windshield surface during that return movement of the parts. The washer water and debris are advantageously blown toward the bottom frame 146 and starting side frame 148, both of which advantageously direct that washer water and debris to the drains 172.

Figure 31:
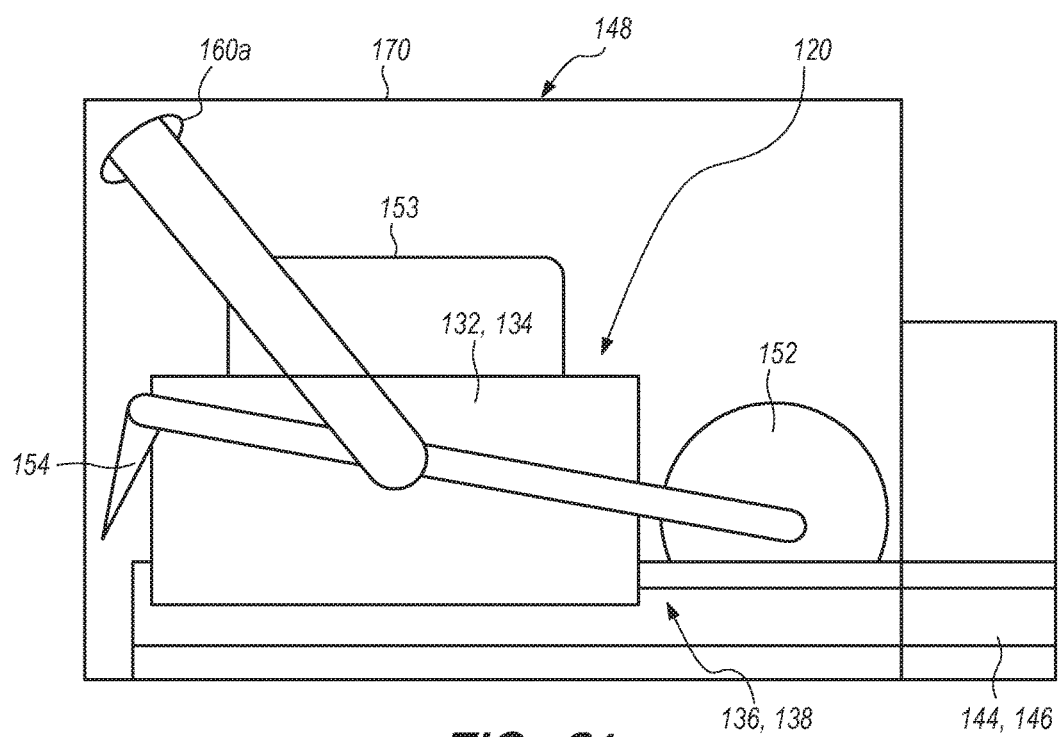
FIG. 31 is a sectional view taken along sections 14-14 of FIG. 30, showing the cleaning apparatus in a stored position in the starting side frame with the cover in a closed position.

As shown in FIG. 31, when the spray bar 156 reaches the starting side frame 148 the spray bar is moved to a storage position so the spray bar, brush 152 and wiper blade 154 may fit within the starting side frame 147 with the cover closed over the starting side frame 148. Because the starting side frame 148 has a rectangular cross-sectional shape, the spray bar is moved to a location adjacent the juncture of the starting side frame 148 and the starting side frame cover 170, which is about 135° away from the surface of the windshield and about 45° from the return location adjacent the windshield and the wiper blade 154. The spray bar may be angled toward the corner of the rectangular cross-sectional shape of the starting side frame 148 to reduce the profile of the side frame 48. The storage configurations will vary depending on the configurations of the parts. Each cover 170 is placed over the starting side frame 148 or the return side frame 150 that is associated with each cover 170. The covers 170 are preferably hinged to the associated starting side frame 148 and return side frame 150, and rotated to the open and closed position by a separate electric motor.

An appropriate control system may be advantageously provided to open and close the covers 170, move the spray bar 154 to its first, second and storage positions at the appropriate time and location, start and stop rotation of the brush 152 at the appropriate time and location, start and stop the flow of washer fluid to and through the first spray nozzles 160a, start and stop the flow of air to and through the second spray nozzles 160b, start, stop and reverse the movement of the top and bottom carriers 132, 134 (and connected brush, spray bar and wiper blade).

The frame 140 is preferably sized to close surround and enclose the periphery of windshield, and preferably the outer, front surface of the frame is flat against or flush with the adjacent surface of the vehicle to which the frame 140 is connected. The frame 140 advantageously extends into the front portion of the vehicle and thus may require some alteration of the vehicle if the frame 140 is retrofit to preexisting vehicles. As the frame 140 encircles the windshield 140, it may be advantageous for the frame 140 to have inwardly extending flanges to which the windshield 122 is connected so that the windshield may be mounted to or connected to the frame 140. The frame 140 is believed optional, especially the top and bottom frames 144, 146 which primarily enclose the rails on which the top and bottom carriers 134, 136 travel and which guide those carriers.

The cleaning device 20 may be actuated by placing the various motors used to open and close the covers 70 on frame 40 (and parts 44, 46, 48, 50), motor 53, pump and air compressor 66 in electrical communication with an activation switch on the motor vehicle, preferably inside the vehicle's passenger compartment and readily accessible by the vehicle's driver. Placement of the activation switch on the vehicle's dashboard is believed suitable. By way of example and not limitation, the activation switch may be an original equipment manufacturer's touch screen mounted to the vehicle such as a dashboard mounted touch screen. The activation switch may be an icon on the touch screen preset to perform one back and forth cleaning pass of the cleaning device when the icon is touched, or may be adjustable to specify more than one reciprocal, back and forth pass of the cleaning device. The icon may be representative of a windshield washer (e.g., pictorially or textually). The activation switch may be preset to allow from one to four cleaning passes. As used herein, one full cleaning pass advantageously includes one reciprocal pass from the starting side 28, to the return side 30, to the starting side 28 of the windshield. By placing appropriate sensors along the upper and/or lower tracks 36, 38 or the top and/or bottom frames 44, 46 the cleaning device may travel less than completely across the windshield 22 and may thus perform a partial cleaning pass over a preselected partial portion of the windshield. Such partial cleaning passes preferably always include the side portion of the windshield 22 in which the cleaning device is stored when not in use, with the cleaning device reversing direction toward the starting side of the windshield 28 before completing a washing passage to the return side of the windshield. A touch screen with variable number inputs or a rotary switch with various cycles hardwired to the switch, are believed suitable to vary the number of whole or partial passes.

The activation switch may be in electrical communication with a computer or electronic circuit that controls the cleaning device.

In lieu of the dashboard mounted touch screen, it is also contemplated that the activation switch may be an application placed in a computer storage of a smartphone or other portable, handheld device. The smartphone may be disposed on a designated area on the dashboard of the vehicle. When it is placed on the designated area, the application may be launched either through recognition of a Bluetooth connection or some other mechanical or electronic sensor. The software application when launched may be used to cause the cell phone or device to emit a signal to the vehicle's computer or electronic circuit that controls the cleaning device 20. The vehicle's computer or electronic circuit that controls the cleaning device may detects the signal and operate or activate the cleaning device. The communication link between the smartphone and the vehicle computer or electronic circuit may be by Bluetooth, wifi, optical or signal currently known in the art or developed in the future. The designated are for the smartphone may be a receptacle in the dashboard of the vehicle to make the smartphone's touch screen easily visible to the driver and easy to touch by the driver.

Alternatively, when smartphone is not in the cabin of the vehicle. The smartphone can establish a communication link with the vehicle's computer or electronic circuit which controls the window cleaner. By way of example and not limitation, the application on the smartphone can be launched. When it is launched, it can search for a communication link with the paired vehicle's communication device. The vehicle's communication device can be always on so that it will establish communication with the smartphone when the application on the smartphone is launched or active. In this regard, when the user is outside of the vehicle, the user can operate the windshield/window cleaner to clean the windshield. The distance may be limited by the communication link (e.g., Bluetooth). Advantageously, the vehicle's computer, processor, etc. and the vehicle's receiver and/or sensor are in electrical communication with a battery of the motor vehicle so that the cleaning system may be actuated even when the vehicle engine is not running.

While described for use with a bus or RV, the method and apparatus may be used with other windshields and other surfaces. While the starting side frame 148 is shown as located on the left side of the windshield 122 (when facing the windshield), the starting side frame may be on the right side. The cleaning device 20 may replace the normal windshield wipers on the motor vehicles, or may be used in addition to the vehicle's standard windshield wipers, although not at the same time as the cleaning device would hit the standard windshield wipers.

In the original equipment manufacturer's touch screen mounted to the vehicle and the smartphone application embodiments discussed above, the touch screen and the smart phone may also be control other aspects of the windshield cleaner 120. By way of example and not limitation, touch screen and the smartphone application can be programmed and linked to the vehicle so as to heat the water with the heater either through a dedicated heater which is a part of the windshield cleaner or a heat exchanger which works with the engine to provide heat for the water. In this regard, the user can use the smartphone and its corresponding application to control the windshield cleaner (e.g., turn on engine, turn on windshield cleaner only, etc.) to provide heated mixture of water and soap to the windshield for the purpose of defrosting the windshield without having to enter the vehicle. The user can operate the windshield cleaner from inside the comfort of a building where a communication link that can be established between the smartphone and the vehicle computer.

The above description is given by way of example, and not limitation. Given the above disclosure, one skilled in the art could devise variations that are within the scope and spirit of the invention disclosed herein, including various ways of attaching the bristles 62 to a base of the cleaning head. Given the above disclosure, one skilled in the art could also devise variations on the disclosed ways to configure the tracks 136, 138 to engage the carriers 132, 134 and to move the carriers 132, 134 along their respective tracks 136, 138, and various ways to configure and rotate the spray bar 156. Further, the various features of the embodiments disclosed herein can be used alone, or in varying combinations with each other and are not intended to be limited to the specific combination described herein.

What is claimed is:

1. A method of cleaning an outer surface of a motor vehicle windshield having a starting side and opposing return side, comprising:
    rotating a spray bar to a first position between a brush and the return side of the windshield, the brush and spray bar each extending from a top to a bottom of the windshield, the spray bar having first and second fluid channels with a plurality of first spray nozzles in fluid communication with the first fluid channel and a plurality of second spray nozzles in fluid communication with the second fluid channel;
    rotating the brush while it is in contact with the outer surface of the windshield;
    flowing a washing fluid through the first channel and the plurality of first spray nozzles at a pressure sufficient to spray the washing fluid through the plurality of first spray nozzles onto the windshield at a location between the rotating brush and the return side of the windshield;
    moving the rotating brush and the spray bar from the starting side to the return side of the windshield while maintaining the rotating brush in contact with the outer surface of the windshield;
    moving a wiper blade from the starting side to the return side of the windshield with the wiper blade not in contact with the windshield, the wiper blade extending between the top and the bottom of the windshield;
    stopping the flow of washing fluid through the first channel and the plurality of first spray nozzles of the spray bar when the spray bar is at the return side of the windshield;
    rotating the spray bar to a second position with the plurality of second spray nozzles adjacent the windshield and between the starting side of the windshield and the wiper blade;
    placing the wiper blade in contact with the windshield;
    stopping the rotating of the brush;
    flowing air through the second channel and the plurality of second spray nozzles at a pressure sufficient to deflect the washing fluid away from the wiper blade; and
    moving the wiper blade, spray bar and brush from the return side to the starting side with the wiper blade in contact with the windshield and the brush not in contact with the windshield.

2. The method of claim 1, further including:
    placing the wiper blade, brush and spray bar in a starting side frame at the starting side of the windshield; and
    placing a removable cover over the starting side frame.

3. The method of claim 1, wherein the flow of washing fluid is stopped before the spray bar is rotated to the second position.

4. The method of claim 1, wherein the flow of air through the second channel is provided by air from a storage container, a compressor or both.

5. The method of claim 1, wherein the step of moving the rotating brush and wiper blade from the starting side to the return side of the windshield comprises connecting a first end of the brush and wiper blade to a carrier block connected to a track extending along one of the top or bottom of the windshield and moving the carrier block along the track.

* * * * *